US012542110B2

(12) United States Patent
Kim et al.

(10) Patent No.: US 12,542,110 B2
(45) Date of Patent: Feb. 3, 2026

(54) DISPLAY APPARATUS

(71) Applicant: LG Display Co., Ltd., Seoul (KR)

(72) Inventors: Kyung-Seok Kim, Paju-si (KR); Jun Heo, Paju-si (KR); Rak-Hee Park, Paju-si (KR); Seung-Wook Yoo, Paju-si (KR); Su-Bin Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/002,261

(22) Filed: Dec. 26, 2024

(65) Prior Publication Data

US 2025/0273173 A1 Aug. 28, 2025

(30) Foreign Application Priority Data

Feb. 27, 2024 (KR) ........................ 10-2024-0027787

(51) Int. Cl.
*G09G 3/3275* (2016.01)
*G09G 3/32* (2016.01)

(52) U.S. Cl.
CPC ............ *G09G 3/3275* (2013.01); *G09G 3/32* (2013.01); *G09G 2310/0275* (2013.01); *G09G 2310/0291* (2013.01); *G09G 2310/08* (2013.01); *G09G 2330/021* (2013.01); *G09G 2330/025* (2013.01)

(58) Field of Classification Search
None
See application file for complete search history.

(56) References Cited

U.S. PATENT DOCUMENTS

| | | | | |
|---|---|---|---|---|
| 2013/0069717 A1* | 3/2013 | Kim | G09G 3/3614 330/9 |
| 2015/0130784 A1* | 5/2015 | Kim | G09G 5/393 345/213 |
| 2016/0042695 A1* | 2/2016 | Park | G09G 3/3648 345/690 |
| 2017/0345383 A1* | 11/2017 | Yin | G09G 3/3648 |
| 2020/0168746 A1* | 5/2020 | Otsubo | H10D 30/6733 |
| 2021/0209985 A1* | 7/2021 | Zhao | G09G 3/20 |

FOREIGN PATENT DOCUMENTS

| | | |
|---|---|---|
| CN | 105374327 A | 3/2016 |
| KR | 101864834 B1 | 6/2018 |

* cited by examiner

*Primary Examiner* — Christopher J Kohlman
(74) *Attorney, Agent, or Firm* — Seed Intellectual Property Law Group LLP

(57) ABSTRACT

A display apparatus includes: a display panel including a plurality of data lines and a plurality of pixels respectively connected to the plurality of data lines; a first data driving portion including a plurality of channels respectively connected to one ends of the plurality of data lines and a plurality of first output buffers which are respectively arranged at the plurality of channels; and a second data driving portion including a plurality of channels respectively connected to the other ends of the plurality of data lines and a plurality of second output buffers which are respectively arranged at the plurality of channels, wherein each of the first and second output buffers is alternately in a positive (+) chopping state and a negative (−) chopping state by frame, and wherein offset directions of output voltages of the first and second output buffers at the corresponding channel are the same in the same frame.

20 Claims, 10 Drawing Sheets

| | | CH(1) | | CH(2) | | CH(3) | | CH(4) | |
|---|---|---|---|---|---|---|---|---|---|
| AMP1 (1)~(4) | chopping | + | − | + | − | + | − | + | − |
| | offset | +5mV | −5mV | −10mV | +10mV | −10mV | +10mV | −15mV | +15mV |
| AMP2 (1)~(4) | chopping | + | − | + | − | + | − | + | − |
| | offset | −5mV | +5mV | +8mV | −8mV | −8mV | +8mV | +10mV | −10mV |
| deviation | | 10mV | 10mV | 18mV | 18mV | 2mV | 2mV | 25mV | 25mV |

*FIG. 9*

| | | CH(1) | | CH(2) | | CH(3) | | CH(4) | |
|---|---|---|---|---|---|---|---|---|---|
| AMP1 (1)~(4) | chopping | + | − | + | − | + | − | + | − |
| | offset | +5mV | −5mV | −10mV | +10mV | −10mV | +10mV | −15mV | +15mV |
| AMP2 (1)~(4) | chopping | − | + | − | + | + | − | − | + |
| | offset | +5mV | −5mV | −8mV | +8mV | −8mV | +8mV | −10mV | +10mV |
| deviation | | 0mV | 0mV | 2mV | 2mV | 2mV | 2mV | 5mV | 5mV |
| | | (adjustment) | | (adjustment) | | | | (adjustment) | |

*FIG. 10*

DISPLAY APPARATUS

CROSS-REFERENCE TO RELATED APPLICATIONS

The present application claims the priority benefit of Korean Patent Application No. 10-2024-0027787 filed in Republic of Korea on Feb. 27, 2024, which is hereby incorporated by reference in its entirety for all purposes as if fully set forth herein.

BACKGROUND

Technical Field

The present disclosure relates to a display apparatus.

Description of the Related Art

As the information society develops, a demand for display apparatuses for displaying images have increased in various forms, and in recent years, various flat display apparatuses such as organic light emitting display apparatuses and liquid crystal display apparatuses have been used.

Recently, the organic light emitting display apparatus is driven by a double bank structure in which data driving portions are placed at both ends of a data line. In the double bank structure, output buffers of upper and lower data driving portions output the same data voltage to the corresponding data line per channel.

However, when the upper and lower output buffers output voltages that are offset in opposite directions, an output voltage deviation may occur between the upper and lower output buffers. The voltage deviation between the upper and lower output buffers causes an overcurrent, which increases power consumption.

BRIEF SUMMARY

The present disclosure provides a display apparatus that can, among others, improve an overcurrent caused by an output voltage deviation between upper and lower output buffers in a double bank structure and reduce power consumption.

Additional features and characteristics of the disclosure will be set forth in the description which follows, and in part will be apparent from the description, or may be learned by practice of the disclosure. These and other features and characteristics of the disclosure will be realized and attained by the structure particularly pointed out in the written description and claims hereof as well as the appended drawings.

As embodied and broadly described herein, a display apparatus includes: a display panel including a plurality of data lines and a plurality of pixels respectively connected to the plurality of data lines; a first data driving portion including a plurality of channels respectively connected to one ends of the plurality of data lines and a plurality of first output buffers which are respectively arranged at a plurality of channels; and a second data driving portion including a plurality of channels respectively connected to the other ends of the plurality of data lines and a plurality of second output buffers which are respectively arranged at a plurality of channels, wherein each of the first and second output buffers is alternately in a positive (+) chopping state and a negative (−) chopping state by frame, and wherein offset directions of output voltages of the first and second output buffers at the corresponding channel are the same in the same frame.

In another aspect, a display apparatus includes: a display panel including a plurality of data lines; a first data driving portion including a plurality of first output buffers which are respectively connected to one ends of the plurality of data lines; and a second data driving portion including a plurality of second output buffers which are respectively connected to the other ends of the plurality of data lines, wherein each of the first and second output buffers is alternately in a positive (+) chopping state and a negative (−) chopping state by frame, and wherein offset directions of data voltages output from the first and second output buffers connected to the same data line are the same.

It is to be understood that both the foregoing general description and the following detailed description are examples and explanatory and are intended to provide further explanation of the disclosure including those of the claims.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings:

FIG. 9 is a view illustrating an example of output voltage offset values according to a chopping mode driving of first and second output buffers before adjustment of offset direction between first and second output buffers according to an embodiment of the present disclosure;

FIG. 10 is a view illustrating an example of output voltage offset values according to a chopping mode driving of first and second output buffers after adjustment of offset direction between first and second output buffers according to an embodiment of the present disclosure.

DETAILED DESCRIPTION

Figure 1:
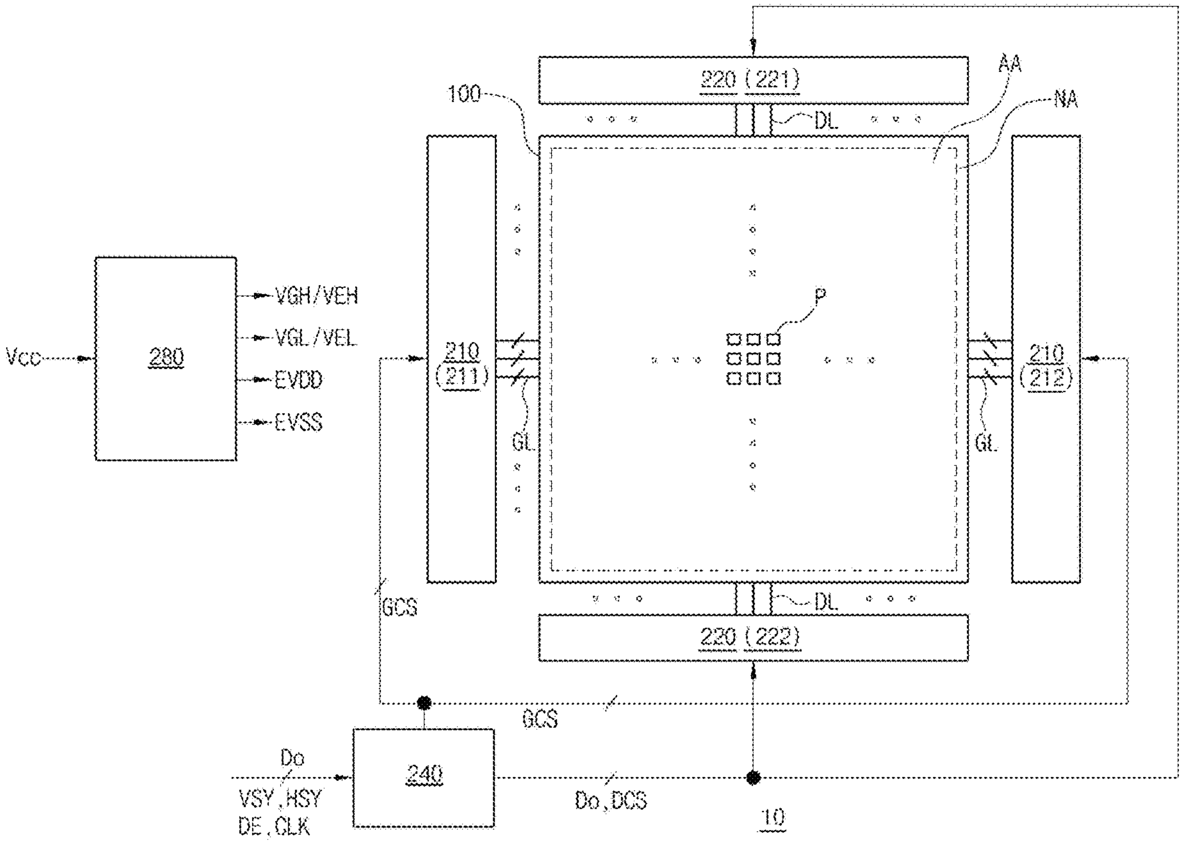
FIG. 1 is a view schematically illustrating a display apparatus according to an embodiment of the present disclosure.

Advantages and features of the present disclosure and methods of achieving them will be apparent with reference to the embodiments described below in detail with the accompanying drawings. However, the present disclosure is not limited to the embodiments disclosed below, but can be realized in a variety of different forms, and only these embodiments allow the present disclosure to be complete. The present disclosure is provided to fully inform the scope of the disclosure to the skilled in the art of the present disclosure, and the present disclosure includes the scope of the claims.

The shapes, sizes, proportions, angles, numbers, and the like disclosed in the drawings for explaining the embodiments of the present disclosure are illustrative, and the present disclosure is not limited to the illustrated matters. The same reference numerals refer to the same components throughout the description.

Furthermore, in describing the present disclosure, if it is determined that a detailed description of the related known technology unnecessarily obscure the subject matter of the present disclosure, the detailed description thereof can be omitted. When 'comprising', 'including', 'having', 'consisting', and the like are used in this disclosure, other parts can be added unless 'only' is used. When a component is expressed in the singular, cases including the plural are included unless specific statement is described.

In interpreting the components, even if there is no separate explicit description, it is interpreted as including a margin range.

In the case of a description of a positional relationship, for example, when the positional relationship of two parts is described as 'on', 'over', 'above', 'below', 'beside', 'under', and the like, one or more other parts can be positioned between such two parts unless 'right' or 'directly' is used.

In the case of a description of a temporal relationship, for example, when a temporal precedence is described as 'after', 'following', 'before', and the like, cases that are not continuous can be included unless 'directly' or 'immediately' is used.

In describing components of the present disclosure, terms such as first, second and the like can be used. These terms are only for distinguishing the components from other components, and an essence, order, order, or number of the components is not limited by the terms.

Respective features of various embodiments of the present disclosure can be partially or wholly connected to or combined with each other and can be technically interlocked and driven variously, and respective embodiments can be independently implemented from each other or can be implemented together with a related relationship.

Hereinafter, embodiments of the present disclosure are described in detail with reference to the drawings. Meanwhile, in the following embodiments, the same and like reference numerals are assigned to the same and like components, and detailed descriptions thereof can be omitted.

Figure 2:
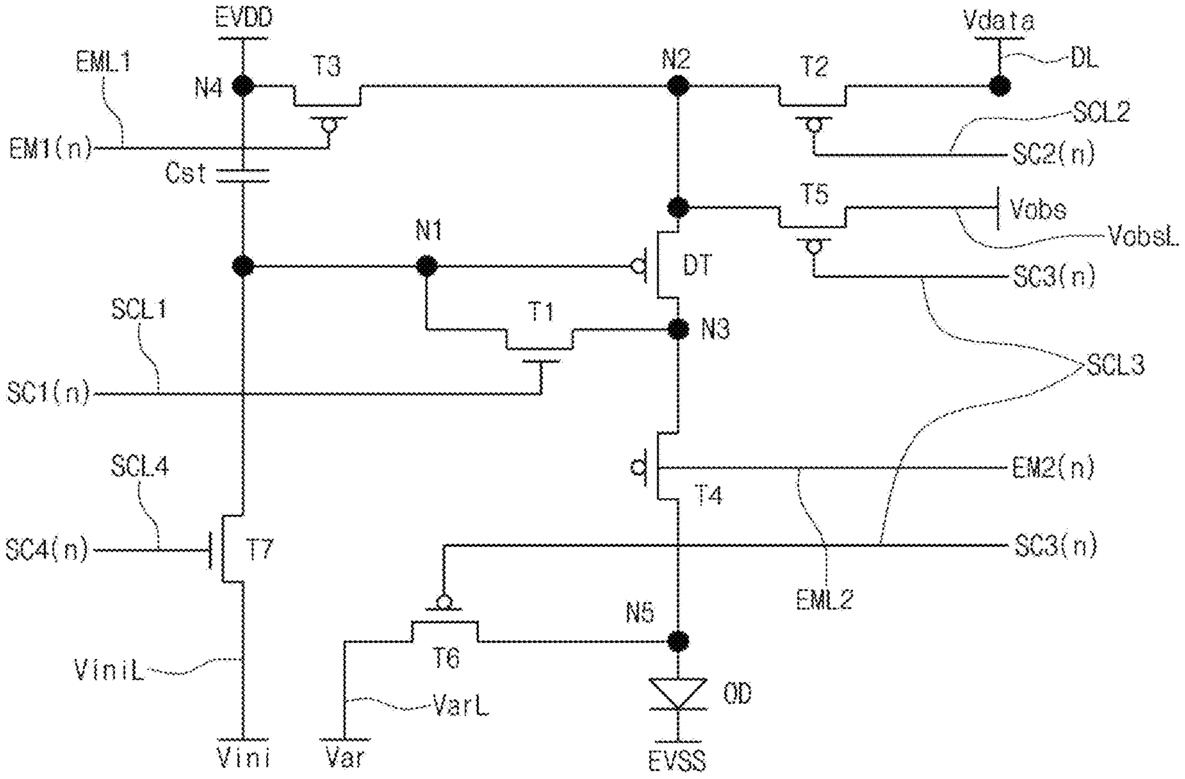
FIG. 2 is a circuit view schematically illustrating an example of a pixel according to an embodiment of the present disclosure.
Figure 3:
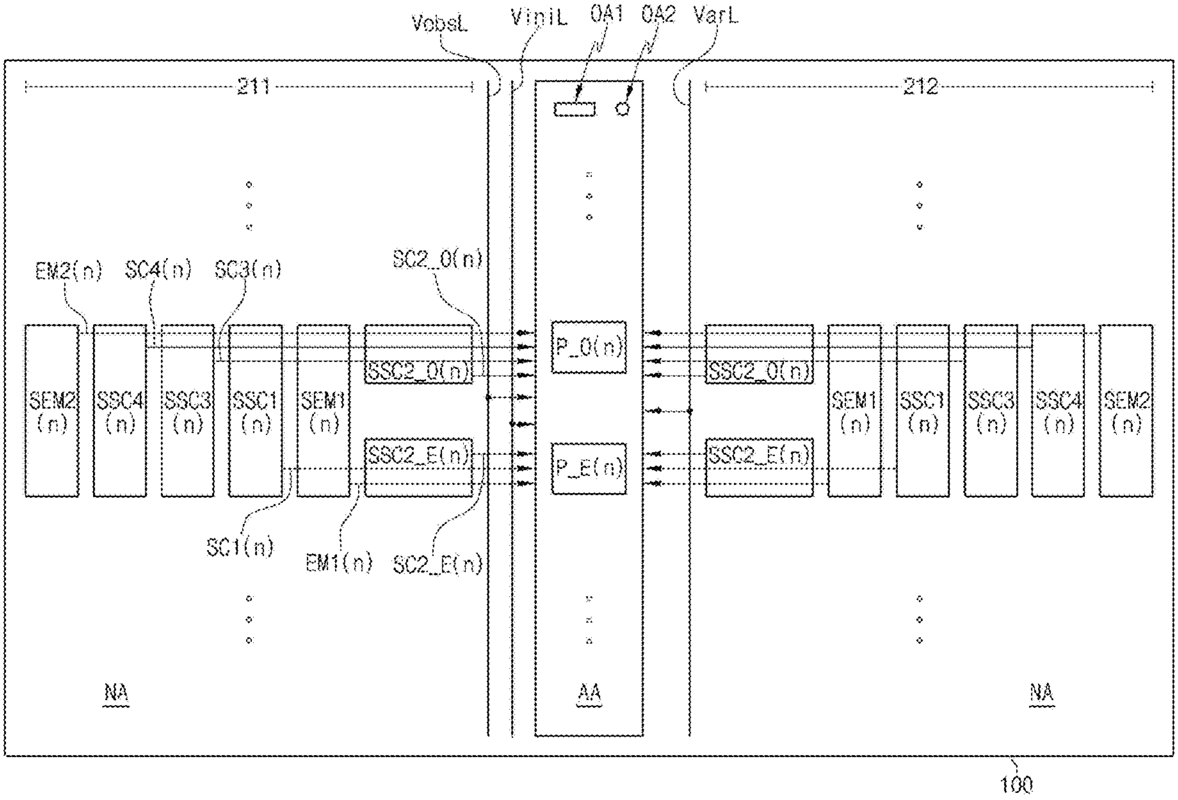
FIG. 3 is a view illustrating a configuration of a gate driving portion of a display apparatus according to an embodiment of the present disclosure.
Figure 4:
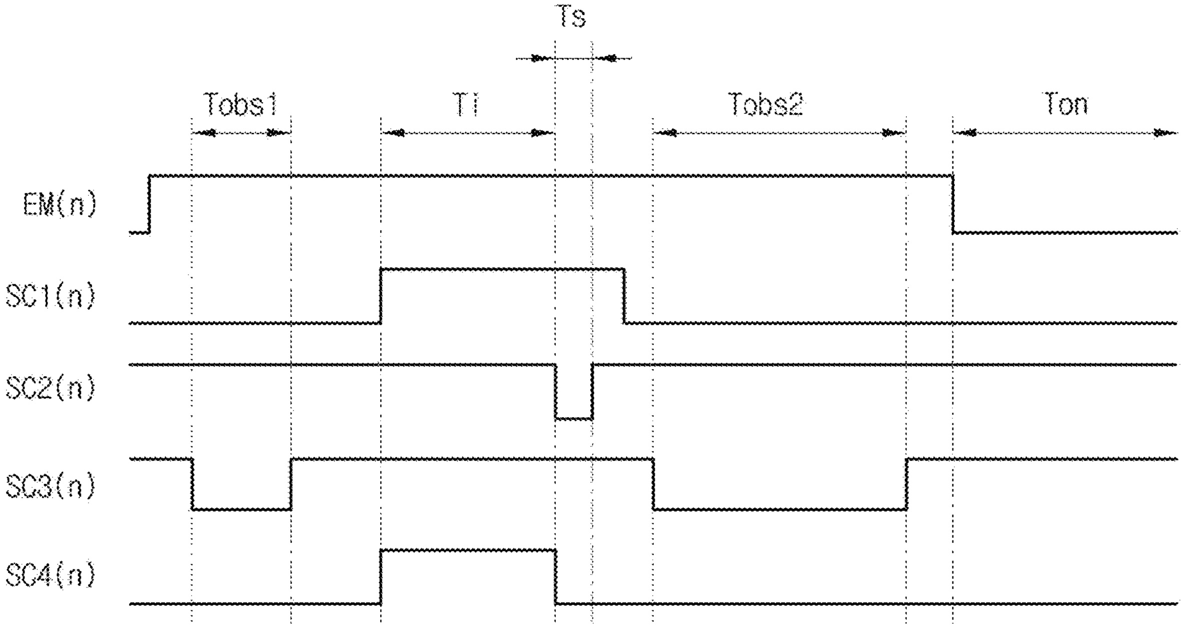
FIG. 4 is a timing chart schematically illustrating an example of driving signals output from a gate driving portion according to an embodiment of the present disclosure.

FIG. 1 is a view schematically illustrating a display apparatus according to an embodiment of the present disclosure. FIG. 2 is a circuit view schematically illustrating an example of a pixel according to an embodiment of the present disclosure. FIG. 3 is a view illustrating a configuration of a gate driving portion of a display apparatus according to an embodiment of the present disclosure. FIG. 4 is a timing chart schematically illustrating an example of driving signals output from a gate driving portion according to an embodiment of the present disclosure.

Prior to a specific description, the display apparatus 10 according to the present embodiment can include one of all types of display apparatuses, including a light emitting display apparatus with a light emitting diode, to which a data driving with a double bank structure is applied.

Meanwhile, for convenience of explanation, in this embodiment, an organic light emitting display apparatus is described as an example of the display apparatus 10.

Referring to FIGS. 1 to 4, the display apparatus 10 of this embodiment can include a display panel 100 and a driving circuit portion that drives the display panel 100. Here, the driving circuit portion can include, for example, a gate driving portion (or gate driving circuit) 210, a data driving portion (or data driving circuit) 220, and a timing control portion (or timing control circuit) 240. In addition, the driving circuit portion can include a power supply portion (or power supply circuit) 280 that supplies power for driving the display panel 100, the gate driving portion 210, the data driving portion 220, and the timing control portion 240.

The display panel 100 can include a display region AA that displays an image, and a non-display region NA arranged outside the display region AA (or surrounding the display region AA).

In the display region AA, a plurality of pixels P can be arranged in a matrix form along a plurality of horizontal lines (or row lines) and a plurality of vertical lines (or column lines).

Here, the plurality of pixels P can include pixels that display different colors, for example, red, green, and blue pixels that display red, green, and blue, respectively, but not limited thereto.

In the display panel 100, various signal lines that transmit driving signals for driving the pixels P can be formed on a substrate.

In this regard, for example, a plurality of data lines DL that transmit data signals (or data voltages) which are image signals can extend in the vertical direction and be connected to the pixels P of the respective vertical lines.

In addition, a gate line GL that transmits a gate signal (or gate voltage) can extend in the horizontal direction and be connected to the pixels P of the corresponding horizontal line.

In this embodiment, a plurality of gate signals may be used to drive each pixel P, for example, a first scan signal SC1 to a fourth scan signal SC4 and an emission control signal EM can be used. Accordingly, a plurality of gate lines GL respectively transmitting the plurality of gate signals can be used, for example, a first scan line SCL1 to a fourth scan line SCL4 and an emission control line (for example, EML1, EML2 in FIG. 2) can be used.

As such, the plurality of pixels P can be defined by the plurality of data lines DL and gate lines GL intersecting each other.

Each pixel P can include a light emitting diode OD as a light emitting element, and a plurality of transistors and at least one capacitor for driving the light emitting diode OD.

Meanwhile, in this embodiment, for convenience of explanation, an 8T1C structure in which the pixel P is equipped with eight transistors T1 to T7 and DT and one capacitor Cst as illustrated in FIG. 2 is taken as an example.

Referring to FIG. 2, the pixel P can include a plurality of switching transistors, for example, first transistor T1 to seventh transistor T7, a driving transistor DT, a storage capacitor Cst, and the light emitting diode OD.

Each of the first to seventh transistors T1 to T7 and the driving transistor DT can include a first electrode, a second electrode, and a gate electrode. One of the first electrode and the second electrode can be a source electrode, and the other of the first electrode and the second electrode can be a drain electrode.

Each of the first to seventh transistors T1 to T7 and the driving transistor DT can be a P-type or N-type transistor. Meanwhile, in FIG. 2, the second, third, fourth, fifth, and sixth transistors T2, T3, T4, T5, and T6 are configured as P-type transistors, the first and seventh transistors T1 and T7 are configured as N-type transistors, and the driving transistor DT is configured as a P-type transistor, but not limited thereto. Alternatively, the driving transistor DT can be configured as an N-type transistor.

The first transistor T1 to the seventh transistor T7 and the driving transistor DT can include semiconductors of the same material or can include semiconductors of different materials. In this regard, for example, some of the first transistor T1 to the seventh transistor T7 and the driving transistors DT can have one semiconductor layer among a polycrystalline silicon layer, an oxide semiconductor layer, and an amorphous silicon layer, and another some of the first transistor T1 to the seventh transistor T7 and the driving transistors DT can have another semiconductor layer among a polycrystalline silicon layer, an oxide semiconductor layer, and an amorphous silicon layer.

Meanwhile, since an oxide semiconductor has excellent off-current characteristics and has characteristics suitable for a switching transistor, at least one of the first transistor T1 to the seventh transistor T7 can have an oxide semiconductor layer. In addition, since a polycrystalline silicon has excellent mobility, the driving transistor DT can have a polycrystalline silicon layer. In another form, the first transistor T1 to the seventh transistor T7 and the driving transistor DT can be configured, for example, the driving transistor DT can have an oxide semiconductor layer.

The gate signals provided to a n-th horizontal line of FIG. 2 (more specifically, at least one of an odd horizontal line and an even horizontal line constituting the n-th horizontal line) can be provided from a corresponding n-th stage of the gate driving portion 210. For example, four scan signals, first to fourth scan signals SC1($n$) to SC4($n$) and two emission control signals, first and second emission control signals EM1($n$), EM2($n$) can be provided. In this case, in the display region AA, first to fourth scan lines SCL1 to SCL4 and first and second emission control lines EML1 and EML2 that are connected to the n-th stage and transmit the first to fourth scan signals SC1($n$) to SC4($n$) and the first and second emission control signals EM1($n$) and EM2($n$) to the pixel P can be arranged. Alternatively, the gate driving portion 210 can be configured to provide one emission control signal instead of the two emission control signals EM1($n$) and EM2($n$).

The first transistor T1 can function as a sampling transistor, the second transistor T2 can function as a data supply transistor, the third and fourth transistors T3 and T4 can function as emission control transistors, the fifth transistor T5 can function as a bias transistor, the sixth transistor T6 can function as a reset transistor (or a first initialization transistor), and the seventh transistor T7 can function as an initialization transistor (or a second initialization transistor).

The light emitting diode OD can include an anode electrode and a cathode electrode. The anode electrode of the light emitting diode OD can be connected to a fifth node N5, and the cathode electrode of the light emitting diode OD can be applied with a low-potential driving voltage EVSS.

The driving transistor DT can include a first electrode connected to a second node N2, a second electrode connected to a third node N3, and a gate electrode connected to a first node N1. The driving transistor DT can provide a driving current to the light emitting diode OD based on a voltage of the first node N1 (i.e., the data voltage Vdata stored in the storage capacitor Cst).

The first transistor T1 can include a first electrode connected to the first node N1, a second electrode connected to the third node N3, and a gate electrode receiving the first scan signal SC1($n$). The first transistor T1 can be turned on in response to the first scan signal SC1($n$), and the data voltage Vdata can be applied (or written or sampled) to the gate electrode of the driving transistor DT.

The storage capacitor Cst can be connected between the first node N1 and a fourth node N4. The storage capacitor Cst can store or maintain a high-potential driving voltage EVDD.

The second transistor T2 can include a first electrode connected to the data line DL (or, receiving the data voltage Vdata), a second electrode connected to the second node N2, and a gate electrode receiving the second scan signal SC2($n$). The second transistor T2 can be turned on in response to the second scan signal SC2($n$) and transmit the data voltage Vdata to the second node N2.

The third transistor T3 and the fourth transistor T4 (or first and second emission control transistors) can be connected between a power line of the high-potential driving voltage EVDD and the light emitting diode OD, and can form a current path along which the driving current generated by the driving transistor DT moves.

The third transistor T3 can include a first electrode connected to the fourth node N4 and receiving the high-potential driving voltage EVDD, a second electrode connected to the second node N2, and a gate electrode receiving the first emission control signal EM1($n$).

The fourth transistor T4 can include a first electrode connected to the third node N3, a second electrode connected to the fifth node N5 (or the anode electrode of the light emitting diode OD), and a gate electrode receiving the second emission control signal EM2($n$).

The third and fourth transistors T3 and T4 can be turned on in response to the first and second emission control signals EM1($n$) and EM2($n$), and the driving current can be supplied to the light emitting diode OD, and the light emitting diode OD can emit light with a luminance corresponding to the driving current.

The fifth transistor T5 can include a first electrode connected to a bias voltage line VobsL that transmits a bias voltage Vobs, a second electrode connected to the second node N2, and a gate electrode that receives the third scan signal SC3($n$).

The sixth transistor T6 can include a first electrode connected to a reset voltage line (or a first initialization voltage line) VarL that transmits an anode reset voltage (or a first initialization voltage) Var, a second electrode connected to the fifth node N5, and a gate electrode that receives the third scan signal SC3($n$).

The fifth and sixth transistors T5 and T6 can be turned on in response to the third scan signal SC3($n$), the bias voltage Vobs can be applied to the second node N2, and the anode reset voltage Var can be applied to the fifth node N5 (i.e., the anode electrode of the light emitting diode OD).

The seventh transistor T7 can include a first electrode connected to an initialization voltage line ViniL that transmits an initialization voltage Vini, a second electrode connected to the first node N1, and a gate electrode that receives the fourth scan signal SC4(*n*). The seventh transistor T7 can be turned on in response to the fourth scan signal SC4(*n*) and can apply the initialization voltage Vini to initialize the gate electrode of the driving transistor DT. Unnecessary charges can remain in the gate electrode of the driving transistor DT due to the high-potential driving voltage EVDD applied to the storage capacitor Cst. Thus, by applying the initialization voltage Vini to the gate electrode of the driving transistor DT through the seventh transistor T7, the remaining charges can be initialized.

The 8T1C structure of the pixel P described above is an example, and the pixel P of this embodiment can be configured with a different structure.

Referring to FIG. 1, the timing control portion 240 can process image data Do input from a host system to be suitable for size and resolution of the display panel 100 and supply them to the data driving portion 220. The timing control portion 240 can generate a gate control signal GCS and a data control signal DCS using synchronization signals input from the host system, for example, a dot clock signal CLK, a data enable signal DE, a horizontal synchronization signal HSY, and a vertical synchronization signal VSY. By supplying the gate control signal GCS and the data control signal DCS generated in this way to the gate driving portion 210 and the data driving portion 220, respectively, the gate driving portion 210 and the data driving portion 220 can be controlled.

The timing control portion 240 can be configured by being combined with various processors, for example, a microprocessor, a mobile processor, an application processor, etc., depending on a device to be mounted.

Meanwhile, the host system can be, for example, a driving system that drives an electronic device to which the display apparatus 10 is applied. The electronic device can be, for example, one of a TV (Television), a navigation system, a monitor, a mobile device, and a wearable device.

The gate driving portion 210 can receive the gate control signal GCS from the timing control portion 240, generate the gate signals, and sequentially apply the gate signals to the gate lines GL. For example, the gate signals can be sequentially output from the top to the bottom in the vertical direction.

The gate driving portion 210 can be arranged, for example, on at least one side of the display region AA. In this embodiment, a case is taken as an example in which the gate driving portion 210 is configured to include first and second gate driving portions 211 and 212 arranged on both sides of the display region AA, for example, on the left and right sides of the display region AA.

The gate driving portion 210 can be formed directly in the non-display region NA on the substrate of the display panel 100, for example, in a GIP (gate-in panel) structure. In this case, the gate driving portion 210 can be formed during processes of forming elements of the display panel 100.

The gate driving portion 210 configured with the GIP structure can include, for example, a first scan driving circuit that sequentially outputs the first scan signals SC1(*n*), a second scan driving circuit that sequentially outputs the second scan signals SC2(*n*), a third scan driving circuit that sequentially outputs the third scan signals SC3(*n*), a fourth scan driving circuit that sequentially outputs the fourth scan signal SC4(*n*), a first emission driving circuit that sequentially outputs the first emission control signals EM1(*n*), and a second emission driving circuit that sequentially outputs the second emission control signals EM2(*n*).

Each of the first scan driving circuit to the fourth scan driving circuit and the first and second emission driving circuits can be configured with a shift register including a plurality of stages that output respective signals.

The gate driving portion 210 is described with further reference to FIG. 3. FIG. 3 illustrates a part of the gate driving portion 210, and for convenience of explanation, a configuration of a portion of the gate driving portion 210 that drives the n-th horizontal line configured with a n-th odd horizontal line (or 2n−1-th horizontal line) and a n-th even horizontal line (or 2n-th horizontal line) of the display region AA is illustrated.

In the first gate driving portion 211 of the gate driving portion 210, for example, first, third, and fourth scan stages SSC1(*n*), SSC3(*n*), and SSC4(*n*) that constitute the first, third, and fourth scan driving circuits, respectively, first and second emission stages SEM1(*n*) and SEM2(*n*) that constitute the first and second emission driving circuits, respectively, and odd and even second scan stages SSC2_O(n) and SSC2_E(n) that constitute the second scan driving circuit can be arranged.

In addition, in the second gate driving portion 212 of the gate driving portion 210, for example, the first, third, and fourth scan stages SSC1(*n*), SSC3(*n*), and SSC4(*n*) that constitute the first, third, and fourth scan driving circuits, respectively, the first and second emission stages SEM1(*n*) and SEM2(*n*) that constitute the first and second emission driving circuits, respectively, and the odd and even second scan stages SSC2_O(n) and SSC2_E(n) that constitute the second scan driving circuit can be arranged.

The arrangement of the first to fourth scan stages SSC1(*n*) to SSC4(*n*) and the first and second emission stages SEM1 (*n*) and SEM2(*n*) shown in FIG. 3 is an example, and they can be arranged in various combinations in the first and second gate driving portions 211 and 212.

The first scan stage SSC1(*n*) can generate the first scan signal SC1(*n*) and output it to the corresponding first scan line SCL1. Accordingly, the pixel P_O(n) of the n-th odd horizontal line and the pixel P_E(n) of the n-th even horizontal line can be commonly applied with the first scan signal SC1(*n*).

The odd second scan stage SSC2_O(n) can generate an odd second scan signal SC2_O(n) and output it to the corresponding odd second scan line SCL2, and the even second scan stage SSC2_E(n) can generate an even second scan signal SC2_E(n) and output it to the corresponding even second scan line SCL2. Accordingly, the pixel P_O(n) of the n-th odd horizontal line can be applied with the odd second scan signal SC2_O(n), and the pixel P_E(n) of the n-th even horizontal line can be applied with the even second scan signal SC2_E(n). Here, the odd second scan signal SC2_O(n) and the even second scan signal SC2_E(n) can have different timings. For example, the odd second scan signal SC2_O(n) and the even second scan signal SC2_E(n) can be applied in a data writing period of the n-th odd horizontal line and a data writing period of the n-th even horizontal line immediately following it, respectively.

The third scan stage SSC3(*n*) can generate the third scan signal SC3(*n*) and output it to the corresponding third scan line SCL3. Accordingly, the pixels P_O(n) and P_E(n) of the n-th odd and even horizontal lines can be commonly applied with the third scan signal SC3(*n*).

The fourth scan stage SSC4($n$) can generate the fourth scan signal SC4($n$) and output it to the corresponding fourth scan line SCLA. Accordingly, the pixels P_O(n) and P_E(n) of the n-th odd and even horizontal lines can be commonly applied with the fourth scan signal SC4($n$).

The first emission stage SEM1($n$) can generate the first emission control signal EM1($n$) and output it to the corresponding first emission control line EML1. Accordingly, the pixels P_O(n) and P_E(n) of the n-th odd and even horizontal lines can be commonly applied with the first emission control signal EM1($n$).

The second emission stage SEM2($n$) can generate the second emission control signal EM2($n$) and output it to the corresponding second emission control line EML2. Accordingly, the pixels P_O(n) and P_E(n) of the n-th odd and even horizontal lines can be commonly applied with the second emission control signal EM2($n$).

Meanwhile, referring to FIG. 3, the bias voltage line VobsL, the reset voltage line VarL, and the initialization voltage line ViniL can be arranged between the gate driving portion 210 and the display region AA.

The bias voltage line VobsL, the reset voltage line VarL, and the initialization voltage line ViniL can respectively supply the bias voltage Vobs, the anode reset voltage Var, and the initialization voltage Vini from the power supply portion 280 to the pixels P within the display region AA.

In FIG. 3, each of the bias voltage line VobsL, the reset voltage line VarL, and the initialization voltage line ViniL is illustrated as being located only on the left or right side of the display region AA, but not limited thereto, and each of the bias voltage line VobsL, the reset voltage line VarL, and the initialization voltage line ViniL can be located on both sides, and even if located on one side, the location on the left or right side is not limited.

Furthermore, referring to FIG. 3, one or more optical regions OA1 and OA2 can be disposed in the display region AA.

The one or more optical regions OA1 and OA2 can be arranged to overlap one or more optical electronic devices, for example, a photographing device such as a camera (or image sensor), and/or a detection sensor such as a proximity sensor and an illuminance sensor. For the operation of the optical electronic device, the one or more optical regions OA1 and OA2 can have a light-transmitting structure formed therein and can have transmittance of a certain level or higher. In other words, a number of pixels P per unit area in the one or more optical regions OA1 and OA2 can be smaller than a number of pixels P per unit area in a regular region excluding the optical regions OA1 and OA2 in the display region AA. That is, a resolution of the one or more optical regions OA1 and OA2 can be lower than a resolution of the regular region within the display region AA.

Referring back to FIG. 1, the data driving portion 220 can receive the image data Do and the data control signal DCS from the timing control portion 240, and in response to the data control signal DCS, the data driving portion 220 can convert the image data Do into analog image data, i.e., data voltages Vdata, and outputs them to the respective data lines DL.

The data driving portion 220 can be configured as a double bank structure that outputs the data voltage Vdata to both ends of the data line DL.

In this regard, the data driving portion 220 can be configured with a first data driving portion 221 arranged on (or connected to) one side of the display panel 100 (or display region AA), for example, on an upper side (or top), and a second data driving portion 222 arranged on (or connected to) on the other side of the display panel 100, for example, on a lower side (or bottom).

Each of the first and second data driving portions 221 and 222 can be configured to include at least one data IC. In this case, the data IC can be connected to the non-display region NA on the corresponding one side of the display panel 100 while mounted on a flexible circuit film, or can be mounted directly on the non-display region NA. In this embodiment, as described later, an example is given in which each of the first and second data driving portions 221 and 222 includes a plurality of data ICs (DICs in FIG. 6) configured in a COF type.

The first and second data driving portions 221 and 222 can be formed with, for example, channels (or output channels) that are respectively connected to the plurality of data lines DL provided in the display panel 100. In this regard, the first data driving portion 221 can be provided with the channel that outputs the data voltage Vdata to the top of each data line DL. In addition, the second data driving portion 222 can be provided with the channel that outputs the data voltage Vdata to the bottom of each data line DL.

As such, the image data Do output from the timing control portion 240 can be provided in common (or identically) to the first and second data driving portions 221 and 222 that are respectively disposed on the upper and lower sides of the display panel 200.

Accordingly, the same data voltage Vdata output from the first and second data driving portions 221 and 222 can be applied to the top and bottom of each data line DL.

As such, in the double bank structure, since the data line DL can receive the same data voltage Vdata at both ends, the data voltage Vdata can be stably supplied into the display region AA.

As described above, the first and second data driving portions 221 and 222 that implement the data driving of the double bank structure can each output the data voltage Vdata in a so-called chopping mode (or chopping manner).

Regarding the chopping mode driving, an operational amplifier (OP-AMP), which forms an output buffer arranged at an output end for each channel and outputting the data voltage Vdata to the data line DL, can alternate between a positive (+) feedback state and a negative (−) feedback state by frame. For example, the output buffer can have the positive feedback state (or negative feedback state) in a n-th frame and a negative feedback state (or positive feedback state) in a n+1-th frame, and the positive feedback state and the negative feedback state can alternate by frame and repeat.

Here, the positive feedback state in which an output terminal of the output buffer is connected to an non-inverting (+) input terminal can be defined as a negative (−) chopping state, and the negative feedback state in which the output terminal of the output buffer is connected to an inverting (−) input terminal can be defined as a positive (+) chopping state.

As such, driving the output buffer alternately in the positive feedback state and the negative feedback state can be referred to as the chopping mode driving.

The chopping mode considers an output deviation characteristics of the OP-AMP constituting the output buffer, and by alternately having the positive feedback state and the negative feedback state in the chopping mode, the output deviation can substantially converge to 0.

In this regard, due to the characteristics of the output buffer, the output voltages of the positive feedback state and the negative feedback state can have opposite offset values.

For example, in a case of the positive feedback state (or negative feedback state), there can be a positive offset (e.g., +10 mV), and conversely, in a case of the negative feedback state (or positive feedback state), there can be a negative offset (e.g., −10 mV).

As such, the output voltages of the output buffer in the positive feedback state and the negative feedback state can have the offsets substantially in the opposite directions.

In order to cancel (or remove) the one-directional offset of the positive feedback state or the negative feedback state, the chopping mode driving in which the output buffer operates alternately in the positive feedback state and the negative feedback state can be applied. Accordingly, the opposing offset values of the positive feedback state and the negative feedback state can be canceled, so that the average offset value of the output voltage can be 0 (or reduced).

Therefore, when the output buffer is driven in the chopping mode as described above, the deviation of the output voltage between the upper and lower channels can be canceled, so that the desired output voltage can be output substantially on average to the data line DL.

In this embodiment, as mentioned above, since the double bank structure is applied, a first output buffer, which is an output buffer of the first data driving 221, can be connected to the top of the data line DL, and a second output buffer, which is an output buffer of the second data driving portion 222, can be connected to the bottom of the data line DL.

Accordingly, the first output buffer on the upper side and the second output buffer on the lower side can each be driven in the chopping mode, and their feedback states can be reversed on a frame-by-frame basis.

However, as the case may be, an output offset direction of the first output buffer and an output offset direction of the second output buffer may be opposite to each other. For example, the output offset of the first output buffer may be converted in a form of "(+), (−), (+), (−)", and conversely, the output offset of the second output buffer may be converted in a form of "(−), (+), (−), (+)".

In this case, for each frame, the first output buffer and the second output buffer have different offset values in the opposite directions, and thus the deviation of the output voltage occurs between the first and second output buffers. As a result, an overcurrent may occur and flow due to the output voltage deviation between the first and second output buffers.

In this case, the overcurrent may increase current consumption (i.e., power consumption) and, in some cases, damage may occur to driving circuits of the data driving portions 221 and 222.

In this embodiment, the first output buffer on the upper side and the second output buffer on the lower side can be set and driven to have the same offset direction for each channel.

Accordingly, the output voltage deviation between the first and second output buffers of each channel can be reduced or eliminated, and thus the overcurrent due to the output voltage deviation can be reduced or eliminated. As a result, power consumption can be reduced, enabling low-power driving, and damage to the driving circuit due to the overcurrent can be prevented.

In such the double bank structure, a method of improving the output voltage deviation between the corresponding channels on the upper and lower sides (or between the upper and lower output buffers of the corresponding channels) driven in the chopping mode is described in more detail below. Herein, the corresponding channels refer to channels of the first data driving 221 and the second data driving portion 222, which are connected to the top and bottom of the same data line DL.

Referring back to FIG. 1, the power supply portion 280 can generate DC power for driving the pixel array and the driving circuit portion of the display panel 100 using, for example, a DC-DC converter. The DC-DC converter can include a charge pump, a regulator, a buck converter, a boost converter, etc.

The power supply portion 280 can receive, for example, a power voltage Vcc that is a driving voltage for driving the display apparatus 10 from the host system, and generate the DC voltages such as the gate low voltages VGL and VEL, the gate high voltages VGH and VEH, the high-potential driving voltage EVDD, and the low-potential driving voltage EVSS. The gate low voltages VGL and VEL and the gate high voltages VGH and VEH can be supplied to a level shifter and the gate driving portion 210. The high-potential driving voltage EVDD and the low-potential driving voltage EVSS can be supplied in common to the pixels P in the display panel 100.

The gate signals applied to the pixel P of the display panel 100 is be described with further reference to FIG. 4. Meanwhile, in FIG. 4, for convenience of explanation, the first and second emission control signals EM1(*n*) and EM2(*n*) are not individually illustrated, but rather one emission control signal EM(n) representing them is illustrated as an example.

In each frame, the pixel P can operate with at least one bias period Tobs1 and Tobs2, an initialization period Ti, a sampling period Ts, and an emission period Ton, but this is only an example and is not necessarily bound to this order.

At least one bias period Tobs1 and Tobs2 can be a period when an on-bias stress (OBS) operation is performed with a bias voltage Vobs is applied, and at this time, the emission control signal EM(n), e.g., the first and second emission control signals EM1(*n*) and EM2(*n*) can have a high voltage, and the third and fourth transistors T3 and T4 can be turned off. The first scan signal SC1(*n*) and the fourth scan signal SC4(*n*) can have a low voltage, and the first transistor T1 and the seventh transistor T7 can be turned off. The second scan signal SC2(*n*) (or odd and even second scan signals) can have a high voltage, and the second transistor T2 can be turned off.

The third scan signal SC3(*n*) can be input as a low voltage, and the fifth and sixth transistors T5 and T6 can be turned on. As the fifth transistor T5 is turned on, the bias voltage Vobs can be applied to the first electrode of the driving transistor DT connected to the second node N2.

Here, the bias voltage Vobs is supplied to the third node N3 which is the drain electrode of the driving transistor DT, so that a charging time or charging delay of the voltage of the fifth node N5, which is the anode electrode of the light emitting diode OD, can be reduced in the emission period Ton. The driving transistor DT can maintain a stronger saturation state.

For example, as the bias voltage Vobs increases, the voltage of the third node N3, which is the drain electrode of the driving transistor DT, can increase, and a gate-source voltage or drain-source voltage of the driving transistor DT can decrease. Thus, it is desirable, but not limited, that the bias voltage Vobs be at least greater than the data voltage Vdata.

At this time, a magnitude of the drain-source current passing through the driving transistor DT can decrease, and a stress of the driving transistor DT in a positive bias stress situation can be reduced, thereby eliminating the charging delay of the voltage of the third node N3. In other words, performing the on-bias stress (OBS) operation before sampling a threshold voltage of the driving transistor DT can alleviate a hysteresis of the driving transistor DT.

The initialization period Ti can be a period that initializes the voltage of the gate electrode of the driving transistor DT. The first scan signal SC1(*n*) to the fourth scan signal SC4(*n*), and the emission control signal EM(n) can have high voltages, and the first transistor T1 and the seventh transistor T7 can be turned on. The second to sixth transistors T2 to T6 can be turned off. As the first and seventh transistors T1 and T7 are turned on, the gate electrode and the second electrode of the driving transistor DT electrically connected to the first node N1 can be initialized to the initialization voltage Vini.

The sampling period Ts can be a period for sampling the threshold voltage of the driving transistor DT and the data voltage Vdata. The first scan signal SC1(*n*), the third scan signal SC3(*n*), and the emission control signal EM(n) can have high voltages, and the second scan signal SC2(*n*) and the fourth scan signal SC4(*n*) can have low voltages. Accordingly, the third to seventh transistors T3 to T7 can be turned off, the first transistor T1 can maintain an on state, and the second transistor T2 can be turned on. That is, as the second transistor T2 is turned on, the data voltage Vdata can be applied to the driving transistor DT, and the first transistor T1 can be diode-connected between the first node N1 and the third node N3, thereby sampling the threshold voltage of the driving transistor DT.

The emission period Ton can be a period when the sampled threshold voltage is canceled and the light emitting diode OD emits light with the driving current corresponding to the sampled data voltage Vdata.

The emission control signal EM(n), e.g., the first and second emission control signals EM1(*n*) and EM2(*n*) can have low voltages, and the third and fourth transistors T3 and T4 can be turned on.

As the third transistor T3 is turned on, the high-potential driving voltage EVDD supplied to the fourth node N4 can be applied to the first electrode of the driving transistor DT connected to the second node N2 through the third transistor T3. The driving current supplied to the light emitting diode OD from the driving transistor DT through the fourth transistor T4 may not be affected by the threshold voltage of the driving transistor DT, so that the threshold voltage of the driving transistor DT can be compensated for.

Figure 5:
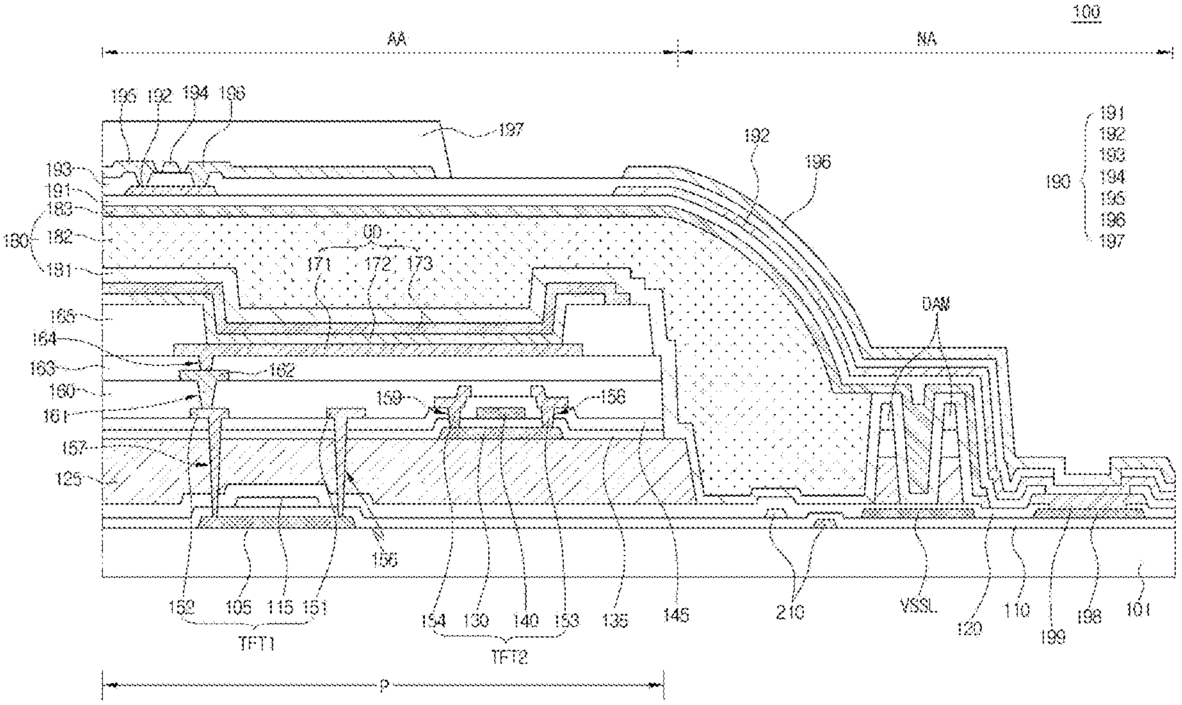
FIG. 5 is a cross-sectional view schematically illustrating an example of a cross-sectional structure of a display panel according to an embodiment of the present disclosure.

Hereinafter, an example of a cross-sectional structure of the display panel 100 of this embodiment is described with further reference to FIG. 5. FIG. 5 is a cross-sectional view schematically illustrating an example of a cross-sectional structure of a display panel according to an embodiment of the present disclosure.

In FIG. 5, for convenience of explanation, two thin film transistors TFT1 and TFT2 are illustrated in the pixel P within the display region AA. Here, the thin film transistor TFT1 positioned relatively lower and closer to the substrate 101 is referred to as a first thin film transistor TFT1, which can be a polycrystalline silicon thin film transistor. The thin film transistor TFT2 positioned relatively upper and farther from the substrate 101 is referred to as a second thin film transistor TFT2, which can be an oxide thin film transistor.

Meanwhile, the first thin film transistor TFT1 can be a driving transistor (DT of FIG. 2), but not limited thereto, and in FIG. 5, for convenience of explanation, a case in which the first thin film transistor TFT1 is connected to the light emitting diode OD is illustrated. In addition, the second thin film transistor TFT2 can be one of the first to seventh transistors (T1 to T7 of FIG. 2) that are switching thin film transistors, more specifically, the first transistor T1 connected to the storage capacitor Cst, but not limited thereto.

The substrate 101 can be configured a, for example, a thin glass substrate (or glass film) or a plastic substrate (or plastic film) so as to implement a flexible characteristics of the display panel 100.

Here, in a case where the substrate 101 is configured as a glass substrate, for example, the substrate 101 can have a thickness of approximately 0.2 mm.

Meanwhile, in a case where the substrate 101 is configured as a plastic substrate, for example, the substrate 101 can include at least one polyimide layer.

The first thin film transistor TFT1 can include a first semiconductor layer 105 disposed on the substrate 101, a first gate electrode 115 overlapping the semiconductor layer 105 with a first insulating layer 110 interposed therebetween, and a first source electrode 151 and a first drain electrode 152 located on a fourth insulating layer 145 over the first gate electrode 115. Here, the first semiconductor layer 105 can be formed of polycrystalline silicon, but not limited thereto.

The first semiconductor layer 105 can include a central channel region and source and drain regions on both sides thereof. The first source electrode 151 and the first drain electrode 152 can be connected to the source region and the drain region of the first semiconductor layer 105 through the first and second contact holes 156 and 157 that are formed in the insulating layers 110, 120, 125, 135, and 145 located below the first source electrode 151 and the first drain electrode 152.

A second insulating layer 120 can be formed on the first gate electrode 115 of the first thin film transistor TFT1.

A first interlayered insulating layer 125 can be formed on the second insulating layer 120. The second thin film transistor TFT2 can be formed on the first interlayered insulating layer 125.

The second thin film transistor TFT2 can include a second semiconductor layer 130 on the first interlayered insulating layer 125, a second gate electrode 140 overlapping the second semiconductor layer 130 with a third insulating layer 135 interposed therebetween, and a second source electrode 153 and a second drain electrode 154 located on the fourth insulating layer 145 over the second gate electrode 140. Here, the second semiconductor layer 130 can be formed of an oxide semiconductor, but not limited thereto.

The second semiconductor layer 130 can include a central channel region and source and drain regions on both sides thereof. The second source electrode 153 and the second drain electrode 154 can be connected to the source and drain regions of the second semiconductor layer 130 through third and fourth contact holes 158 and 159 formed in the insulating layers 135 and 145 located below the second source electrode 153 and the second drain electrode 154.

A second interlayered insulating layer (or first planarization layer) 160 can be formed on the second thin film transistor TFT2.

Here, the first, second, third, and fourth insulating layers 110, 120, 135, and 145 can be formed of an inorganic insulating material such as silicon nitride or silicon oxide, but not limited thereto.

In addition, the first and second interlayered insulating layers 125 and 160 can be formed of an organic insulating material such as photo acrylic or benzocyclobutene, but not limited thereto.

A connection electrode 162 can be formed on the second interlayered insulating layer 160. The connection electrode 162 can be connected to the first drain electrode 152 through a contact hole 161 formed in the second interlayered insulating layer 160.

A third interlayered insulating layer (or second planarization layer) 163 can be formed on the connection electrode 162. The third interlayered insulating layer 163 can be formed of an organic insulating material such as photo acrylic or benzocyclobutene, but not limited thereto.

The light emitting diode OD and a bank 165 can be formed on the third interlayered insulating layer 163.

The light emitting diode OD can include an anode electrode (or first electrode) 171, a light emitting layer 172, and a cathode electrode (or second electrode) 173.

The anode electrode 171 can be connected to the connection electrode 162 through the contact hole 164 formed in the third interlayered insulating layer 163.

The bank 165 can be disposed along a boundary of the pixel P and can be formed to cover an edge of the anode electrode 171. The light emitting layer 172 can be formed on the anode electrode 171 exposed through an opening of the bank 165.

The cathode electrode 173 can be formed on the light emitting layer 172 and can be applied with the low-potential driving voltage (EVSS of FIG. 2).

An encapsulation layer 180 can be formed on the cathode electrode 173. The encapsulation layer 180 can include at least one inorganic encapsulation layer and at least one organic encapsulation layer, but not limited thereto. In this disclosure, a structure of the encapsulation layer 180, in which a first encapsulation layer 181, a second encapsulation layer 182, and a third encapsulation layer 183 are sequentially stacked, is described as an example.

The first encapsulation layer 181 can be formed on the substrate 101 on which the cathode electrode 173 is formed. The third encapsulation layer 183 can be formed on the substrate 101 on which the second encapsulation layer 182 is formed, and can be formed to surround an upper surface, a lower surface, and a side surface of the second encapsulation layer 182 together with the first encapsulation layer 181. The first encapsulation layer 181 and the third encapsulation layer 183 can reduce or prevent external moisture or oxygen from penetrating into the light emitting diode OD. The first encapsulation layer 181 and the third encapsulation layer 183 can be formed of an inorganic insulating material capable of low-temperature deposition, such as silicon nitride, silicon oxide, silicon oxynitride, or aluminum oxide.

The second encapsulating layer 182 can acts as a buffer to relieve stress between layers due to bending of the display apparatus 10, and can flatten steps between layers. The second encapsulation layer 182 can be formed on the substrate 101 on which the first encapsulation layer 181 is formed, using a non-photosensitive organic insulating material such as acrylic resin, epoxy resin, phenolic resin, polyamide resin, polyimide resin, polyethylene, or silicon oxycarbon (SiOC), or a photosensitive organic insulating material such as photo acrylic, but not limited thereto. When the second encapsulation layer 182 is formed through an inkjet method, a dam DAM can be placed in the non-display region NA to prevent the second encapsulation layer 182 in liquid form from spreading to an edge of the substrate 101. The dam DAM can be disposed closer to the edge of the substrate 101 than the second encapsulation layer 182. By the dam DAM, the second encapsulation layer 182 can be prevented from spreading to a pad region, where a conductive pad is disposed, on an outermost edge of the substrate 101.

The dam DAM can be designed to prevent the spreading of the second encapsulation layer 182, but if the second encapsulation layer 182 is formed to exceed a height of the dam DAM during a process, the second encapsulation layer 182 as an organic layer can be exposed to an outside, so that moisture, etc., can easily penetrate into the light emitting element. To prevent this, 10 or more dam DAM can be formed in succession, but not limited thereto.

The dam DAM can be formed simultaneously with the first interlayered insulating layer 125, the second interlayered insulating layer 160, and the third interlayered insulating layer 163. When forming the first interlayered insulating layer 125, a lower layer of the dam DAM can be formed together, and when forming the second and third interlayered insulating layers 160 and 163, an upper layer of the dam DAM can be formed together, so that the dam DAM can be formed in a triple laminated structure. As another example, the dam DAM can be formed with one or two of the first, second, and third interlayered insulating layers 125, 160, and 163.

Accordingly, the dam DAM can be formed of the same material as the first interlayered insulating layer 125, the second interlayered insulating layer 160, and the third interlayered insulating layer 163, but not limited thereto.

The dam DAM can be formed to overlap a low-potential driving voltage line VSSL. For example, the low-potential driving voltage line VSSL can be formed at a lower layer of a region, where the dam DAM is located, in the non-display region NA.

The low-potential driving voltage line VSSL and the gate driving portion 210 configured in the GIP structure can be formed along a periphery of the display panel 100, and the low-potential driving voltage line VSSL can be located outside the gate driving portion 210. In addition, the low-potential driving voltage line VSSL can be connected to the cathode electrode 173 to apply the low-potential driving voltage EVSS. The gate driving portion 210 is simply shown in a planar and cross-sectional manner in the drawings, but can be configured with the same structure as the first thin film transistor TFT1 and/or the second thin film transistor TFT2 of the display region AA.

A touch layer (or touch element layer) 190 can be disposed on the encapsulation layer 180. In the touch layer 190, a touch buffer layer 191 can be positioned between a touch sensor metal including touch electrode connection lines 192 and 194 and touch electrodes 195 and 196, and the cathode electrode 173 of the light emitting diode OD.

The touch buffer layer 191 can block a chemical solution (developer, etchant, etc.) used in a manufacturing process of the touch sensor metal disposed on the touch buffer layer 191 or moisture from the outside from penetrating into the light emitting layer 172 containing an organic material. Accordingly, the touch buffer layer 191 can prevent damage to the light emitting layer 172 that is vulnerable to the chemical solution or moisture.

According to a mutual-capacitance-based touch sensor structure, the touch electrodes 195 and 196 can be disposed on the touch buffer layer 191, and the touch electrodes 195 and 196 can be arranged to cross each other.

The touch electrode connection lines 192 and 194 can electrically connect the touch electrodes 195 and 196. One of the touch electrode connection lines 192 and 194, and the touch electrodes 195 and 196 can be located at different layers with a touch insulation layer 193 interposed therebetween. In addition, one of the touch electrode connection lines 192 and 194 and the other of the touch electrode connection lines 192 and 194 can be located at different layers with the touch insulation layer 193 interposed therebetween.

The touch electrode connection lines 192 and 194 can be arranged to overlap the bank 165, thereby preventing decrease in aperture ratio, but not limited thereto.

Meanwhile, a part of the touch electrodes 195 and 196 and a part of the touch electrode connection line 192 can extend along the top and side surfaces of the encapsulation layer 180 and the top and side surfaces of the dam DAM and be electrically connected to a touch driving circuit through a touch pad 198 and 199.

A part of the touch electrodes 195 and 196 and a part of the touch electrode connection line 192 can receive a touch driving signal from the touch driving circuit and transmit it to the touch electrodes 195 and 196, and can transmit a touch sensing signal detected by the touch electrodes 195 and 196 to the touch driving circuit.

In this regard, for example, a driving IC (e.g., data IC, etc.) of the data driving portion 220 including the touch driving circuit can be configured in a COF type and connected to the non-display region NA of the substrate 101 of the display panel 100, and in this case, an end of the touch pad 198 and 199 can be connected to a flexible circuit film on which the driving IC is mounted, so that a signal can be transmitted.

A touch protective layer 197 can be disposed on the touch electrodes 195 and 196. In the drawing, the touch protective layer 197 is shown as being disposed only on the touch electrodes 195 and 196, but not limited thereto, and the touch protective layer 197 can extend before or after the dam DAM to be disposed on the touch electrode connection line 192.

In addition, a color filter can be disposed on the encapsulation layer 180. The color filter can be positioned on the touch layer 190, or between the encapsulation layer 180 and the touch layer 190.

Hereinafter, structure and method for improving the output voltage deviation between the corresponding upper and lower channels (or between the upper and lower output buffers of the corresponding channels) driven in the chopping mode in the data driving portion 220 configured with the double bank structure according to the embodiment of the present disclosure are described in detail.

Figure 6:
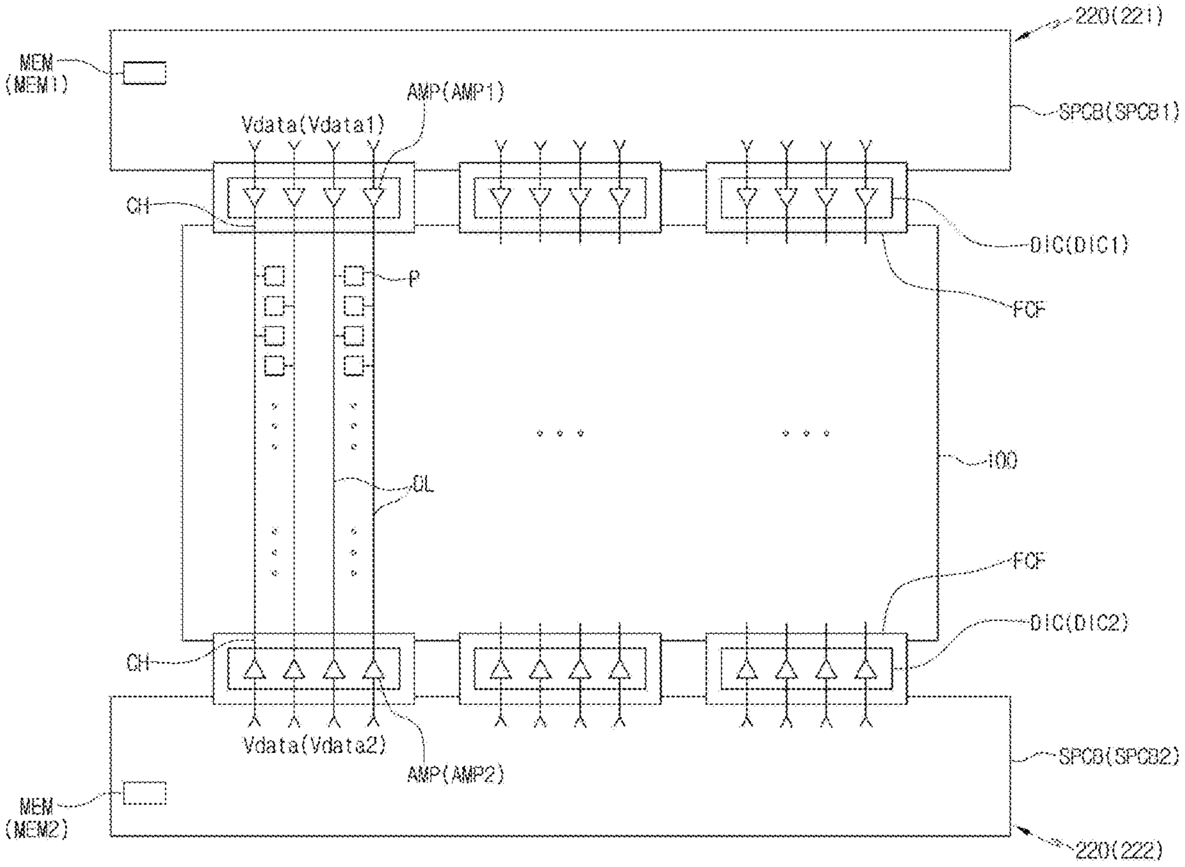
FIG. 6 is a view schematically illustrating a configuration of a data driving portion of a double bank structure according to an embodiment of the present disclosure.
Figure 7:
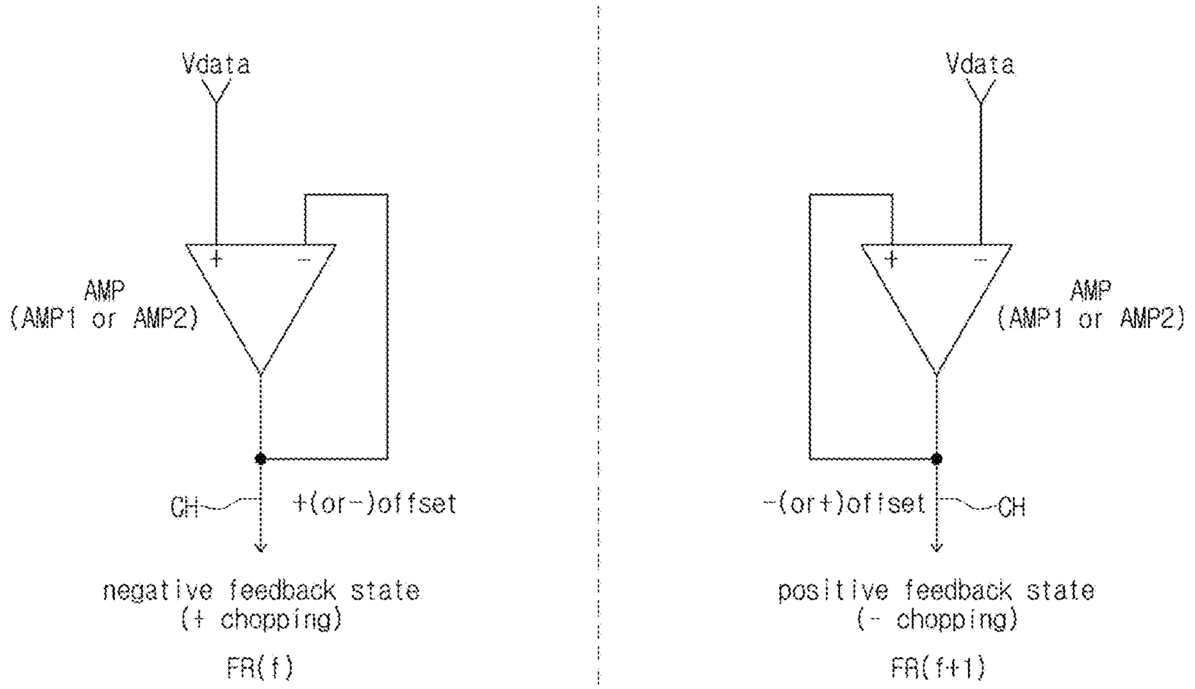
FIG. 7 is a view illustrating a positive (+) chopping state and a negative (−) chopping state of an output buffer of a data driving portion according to an embodiment of the present disclosure.

FIG. 6 is a view schematically illustrating a configuration of a data driving portion of a double bank structure according to an embodiment of the present disclosure. FIG. 7 is a view illustrating a positive (+) chopping state and a negative (−) chopping state of an output buffer of a data driving portion according to an embodiment of the present disclosure.

Referring to FIGS. 6 and 7, the data driving portion 220 of the double bank structure can include the first data driving portion 221 arranged on one side, for example, an upper side (or top) of a display panel 100, and the second data driving portion 222 arranged on the other side, for example, the lower side (or bottom) of the display panel 100.

Each of the first and second data driving portions 221 and 222 can be configured to include at least one data IC DIC and a source board SPCB connected to the data ICs DIC. Meanwhile, in this embodiment, a case where each of the first and second data driving portions 221 and 222 is configured with a plurality of data ICs DIC, for example, three data ICs DIC is taken as an example.

Here, the data IC DIC provided in the first data driving portion 221 can be referred to as a first data IC DIC1, and the data IC DIC provided in the second data driving portion 222 can be referred to as a second data IC DIC2. In addition, the source board SPCB provided in the first data driving portion 221 can be referred to as a first source board SPCB1, and the source board SPCB provided in the second data driving portion 222 can be referred to as a second source board SPCB2.

Accordingly, signals output from the timing control portion 240 can be transmitted to the first data IC DIC1 via the first source board SPCB1, and can also be transmitted to the second data IC DIC2 via the second source board SPCB2.

In this embodiment, a case where the data ICs DIC of the first and second data driving portions 221 and 222 is mounted on respective flexible circuit films FCF in a COF type is taken as an example.

In this case, the first data IC DIC1 can be mounted on the flexible circuit film FCF, and the flexible circuit film FCF can be connected to the top of the display panel 100 and be connected to the first source board SPCB1. In other words, the first data IC DIC1 can be electrically connected to the first source board SPCB1 and the display panel 100 through the flexible circuit film FCF.

Likewise, the second data IC DIC2 can be mounted on the flexible circuit film FCF, and the flexible circuit film FCF can be connected to the bottom of the display panel 100 and be connected to the second source board SPCB2. In other words, the second data IC DIC2 can be electrically connected to the first source board SPCB1 and the display panel 100 through the flexible circuit film FCF.

Meanwhile, the first data driving portion 221 (more specifically, the first source board SPCB1) can be equipped with a memory MEM (or a first memory MEM1), and the second data driving portion 222 (more specifically, the second source board SPCB2) can be equipped with a memory MEM (or a second memory MEM2). The memory MEM disposed in each of the first and second data driving portions 221 and 222 is described in detail later.

In the first data driving portion 221 (more specifically, the first data ICs DIC1) on the upper side, for example, a plurality of channels CH can be formed that are each connected to an upper end (or top end) of each of the plurality of data line DL of the display panel 100 and output the data voltage Vdata.

Likewise, the second data driving portion 222 (more specifically, the second data ICs DIC2) on the lower side, for example, a plurality of channels CH can be formed that are each connected to a lower end (or bottom end) of each of the plurality of data line DL and output the data voltage Vdata.

As such, the first data driving portion 221 and the second data driving portion 222 can be configured to be symmetrical vertically, and can output substantially the same data voltage Vdata to the corresponding upper and lower channels CH.

Here, for convenience of explanation, the data voltage Vdata output by channel CH from the first data driving portion 221 can be referred to as a first data voltage Vdata1, and the data voltage Vdata output by channel CH from the second data driving portion 222 can be referred to as a second data voltage Vdata2.

As such, by arranging the first and second data driving portions 221 and 222 of the double bank structure at the top and bottom of the display panel 200, the first and second data voltages Vdata1 and Vdata2 output from the corresponding channels CH the first and second data driving portions 221 and 222 can be applied to the upper and lower ends of each data line DL, respectively.

A first output buffer AMP1, which is an output buffer AMP that outputs the data voltage Vdata per channel CH, can be formed in the first data driving portion 221 (more specifically, the first data IC DIC1). Similarly, a second output buffer AMP2, which is an output buffer AMP that outputs the data voltage Vdata per channel CH, can be formed in the second data driving portion 222 (more specifically, the second data IC DIC2).

As such, the output buffers (AMP: AMP1 and AMP2) formed in the first and second data driving portions 221 and 222 can output the corresponding data voltages Vdata in the chopping mode.

In this regard, referring to FIG. 7, for example, the output buffer AMP disposed at each channel CH of the first and second data driving portions 221 and 222 can alternately operate in a negative feedback state (or positive (+) chopping state) and a positive feedback state (or negative (−) chopping state) by frame FR.

As an example, in a f-th frame FR(f), the output buffer AMP can have the negative feedback state, and in a f+1-th frame FR(f+1), the output buffer AMP can have the positive feedback state. As such, the output buffer AMP can repeatedly operate in a negative feedback state and a positive feedback state alternately by frame FR.

Here, the positive feedback state in which the output terminal of the output buffer AMP is connected to the non-inverting (+) input terminal can be called the negative (−) chopping state, and the negative feedback state in which the output terminal of the output buffer AMP is connected to the inverting (−) input terminal can be called the positive (+) chopping state.

When the chopping mode is used to switch the feedback states of the output buffer AMP frame by frame as above, the output voltage of the output buffer AMP can be substantially prevented from having an offset to one direction of the + or − direction based on the input data voltage Vdata to result in an output deviation.

In this regard, due to the characteristics of the output buffer AMP, the output voltages of the positive feedback state and the negative feedback state can have opposite offset values. For example, in the positive feedback state (or negative feedback state), the output voltage can have a positive (+) offset, for example, +10 mV, and conversely, in the negative feedback state (or positive feedback state), the output voltage can have a negative (−) offset, for example, −10 mV.

As such, the output buffer AMP can have the offsets in output voltage that are substantially in the opposite directions between the positive feedback state and the negative feedback state.

In this regard, when the chopping mode driving in which the output buffer AMP operates alternately in the positive feedback state and the negative feedback state is applied, the offset value of the positive feedback state, and the offset value of the negative feedback state in the opposite direction to the offset value of the positive feedback state can be canceled from each other, so that the average offset value of the output voltage of the output buffer AMP can be 0 (or reduced).

Therefore, by driving the output buffer AMP in the chopping mode, the output voltage deviation of the output buffer AMP can be canceled, so that the data voltage Vdata with a substantially 0 offset can be output.

Meanwhile, since the double bank structure is applied in this embodiment, the output voltage from the first output buffer AMP1 of the first data driving portion 221 can be applied to the upper end of the data line DL, and the output voltage from the second output buffer AMP2 of the second data driving portion 222 can be applied to the lower end of the data line DL.

Accordingly, the first output buffer AMP1 on the upper side and the second output buffer AMP2 on the lower side can each be driven in the chopping mode, and their feedback states can be switched by frame FR.

However, due to various factors, the output buffers AMP may be different (or may not match) in the offset directions (i.e., the + and −offset directions) according to the feedback states. For example, an output buffer AMP may have the +offset in the positive feedback state and have the −offset in the negative feedback state, and another output buffer AMP may have the −offset in the positive feedback state and have the +offset in the negative feedback state.

Accordingly, the first and second output buffers AMP1 and AMP2 disposed at some of the plurality of channels CH may have the same output offset directions in the same feedback state (or in the same frame FR), but the first and second output buffers AMP1 and AMP2 disposed at other some of the plurality of channels CH may have the opposite output offset directions in the same feedback state (or in the same frame FR).

Figure 8:
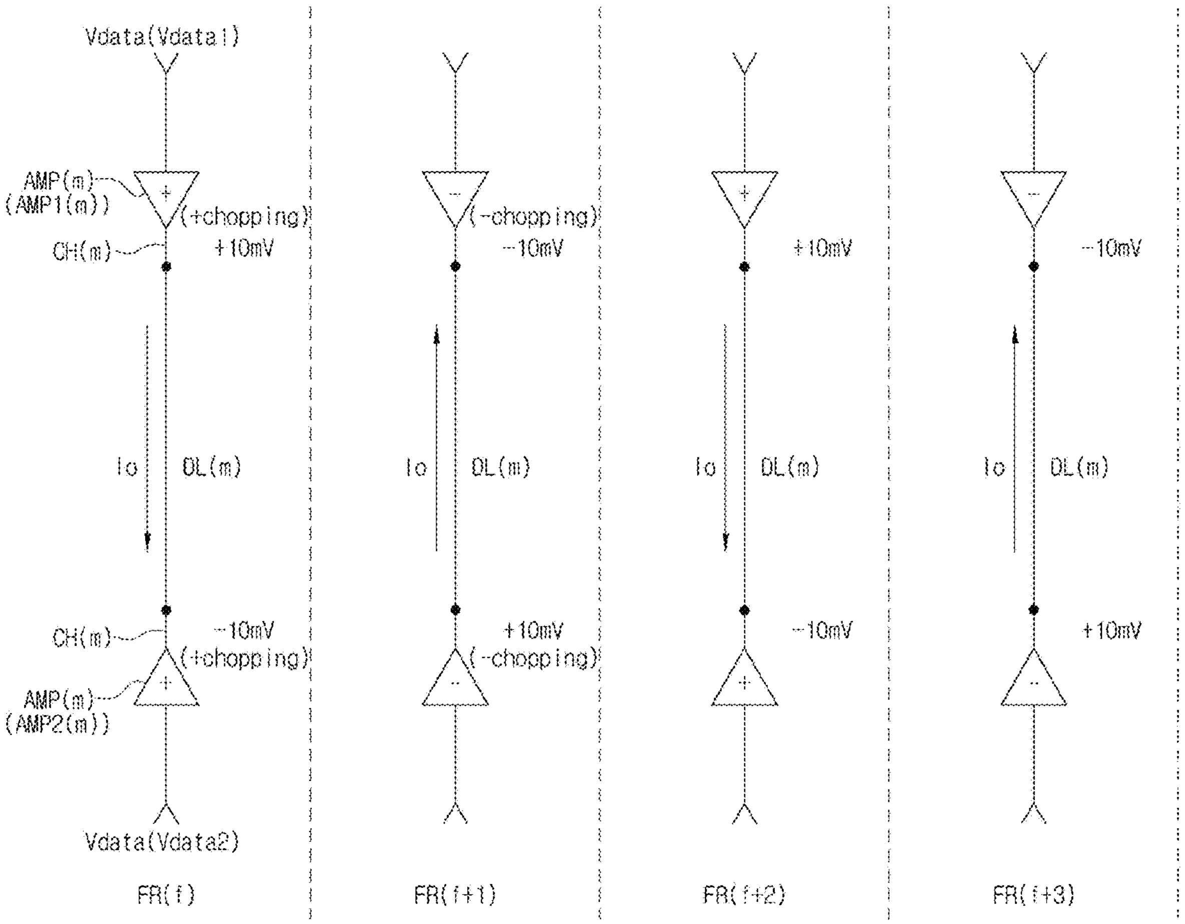
FIG. 8 is a view schematically illustrating a case where first and second output buffers have output offset directions opposite to each other according to an embodiment of the present disclosure.

This is described with further reference to FIG. 8. FIG. 8 is a view schematically illustrating a case where first and second output buffers have output offset directions opposite to each other according to an embodiment of the present disclosure.

In FIG. 8, as a case of a general chopping mode driving, a case is given where the first and second output buffers AMP1(*m*) and AMP2(*m*) of a m-th channel CH(m) (or m-th upper and lower channels CH(m)) connected to the upper and lower ends of a m-th data line DL(m), respectively, have the same feedback state, i.e., the same chopping state in the same frame FR.

In addition, a case is given where the first output buffer AMP1(*m*) has the +offset value, for example, +10 mV in the +chopping state (i.e., negative feedback state), and has the −offset value, for example, −10 mV in the −chopping state (i.e., positive feedback state), and conversely, the second output buffer AMP2(*m*) has the −offset value, for example, −10 mV in the +chopping state (i.e., negative feedback state), and the +offset value, for example, +10 mV in the −chopping state (i.e., positive feedback state).

In this case, during the f-th to f+3-th frames FR(f) to FR(f+3), the output voltage of the first output buffer AMP1(*m*) is alternately offset as "+10 mV, −10 mV, +10 mV, −10 mV", and conversely, the output voltage of the second output buffer AMP2(*m*) is alternately offset as "−10 mV, +10 mV, −10 mV, +10 mV".

As such, the first and second output buffers AMP1(*m*) and AMP2(*m*) have the offset values in the opposite directions for each frame FR, so that a high output voltage deviation of approximately 20 mV occurs between the first and second output buffers AMP1(*m*) and AMP2(*m*) for each frame FR.

Accordingly, for each frame FR, an overcurrent Io is generated due to the output voltage deviation between the first and second output buffers AMP1(*m*) and AMP2(*m*) and flows to the corresponding channels CH(n).

In this case, the overcurrent Io increases current consumption, i.e., power consumption, and in some cases, damage may occur to the driving circuit (e.g., data IC DIC) of the data driving portion 220.

In this embodiment, the first and second output buffers AMP1 and AMP2 for each channel CH can be driven by adjusting their offset directions (or chopping states or feedback states) so that their output offsets have the same direction in the same frame FR.

This refers to FIGS. 9 and 10. FIG. 9 is a view illustrating an example of output voltage offset values according to a chopping mode driving of first and second output buffers before adjustment of offset direction between first and second output buffers according to an embodiment of the present disclosure. FIG. 10 is a view illustrating an example of output voltage offset values according to a chopping mode driving of first and second output buffers after adjustment of offset direction between first and second output buffers according to an embodiment of the present disclosure.

In FIGS. 9 and 10, for convenience of explanation, first to fourth channels CH(1) to CH(4) on the upper and lower sides are illustrated as examples.

In addition, FIG. 9 shows a case of a general chopping mode driving in which, as mentioned above, the first and second output buffers AMP1 and AMP2 located at the corresponding channel CH have the same feedback state in the same frame FR, and the first and second output buffers AMP1 and AMP2 at each channel CH are driven alternately in the +chopping state and the −chopping state by frame FR.

First, referring to FIG. 9, for example, for the first channel CH(1), the first output buffer AMP1(1) has an offset value of +5 mV in the +chopping state (i.e., negative feedback state), and has an offset value of −5 mV in the −chopping state (i.e., positive feedback state). The second output buffer AMP2(1) has an offset value of −5 mV in the +chopping state and has an offset value of +5 mV in the −chopping state. As such, the output voltages of the first and second output buffers AMP1 (1) and AMP2(1) of the first channel CH(1) are offset in the opposite directions in the same chopping state, and a high offset deviation, i.e., a high output voltage deviation of 10 mV occurs between the first and second output buffers AMP1(1) and AMP2(1) in the same chopping state.

In addition, for the second channel CH(2), the first output buffer AMP1(2) has an offset value of −10 mV in the +chopping state, and has an offset value of +10 mV in the −chopping state. The second output buffer AMP2(2) has an offset value of +8 mV in the +chopping state, and has an offset value of −8 mV in the − chopping state. As such, the output voltages of the first and second output buffers AMP1 (2) and AMP2(2) of the second channel CH(2) are offset in the opposite directions in the same chopping state, and a high output voltage deviation of 18 mV occurs between the first and second output buffers AMP1(2) and AMP2(2) in the same chopping state.

Meanwhile, for the third channel CH(3), the first output buffer AMP1(3) has an offset value of −10 mV in the +chopping state, and has an offset value of +10 mV in the −chopping state. The second output buffer AMP2(3) has an offset value of −8 mV in the +chopping state, and has an offset value of +8 mV in the −chopping state. As such, the output voltages of the first and second output buffers AMP1 (3) and AMP2(3) of the third channel CH(3) are offset in the same direction in the same chopping state, and a low output voltage deviation of 2 mV occurs between the first and second output buffers AMP1(3) and AMP2(3) in the same chopping state.

Meanwhile, for the fourth channel CH(4), the first output buffer AMP1(4) has an offset value of −15 mV in the +chopping state, and has an offset value of +15 mV in the −chopping state. The second output buffer AMP2(4) has an offset value of +10 mV in the +chopping state, and has an offset value of −10 mV in the −chopping state. As such, the output voltages of the first and second output buffers AMP1 (4) and AMP2(4) of the fourth channel CH(4) are offset in the opposite directions in the same chopping state, and a high output voltage deviation of 25 mV occurs between the first and second output buffers AMP1(4) and AMP2(4) in the same chopping state.

As above, at the first, second, and fourth channels CH(1), CH(2), and CH(4), the offset directions of the first and second output buffers AMP1 and AMP2 are opposite, so the output voltage deviation is high, which may cause a significant amount of overcurrent to occur.

On the other hand, at the third channel CH(3), the offset directions of the first and second output buffers AMP1 and AMP2 are the same, so the output voltage deviation is low, so an overcurrent decreases (or is prevented).

In this embodiment, for the channels CH(1), CH(2), and CH(4) at which the offset directions of the first and second output buffers AMP1 and AMP2 are opposite as described above, the chopping state (or chopping order) of the first and second output buffers AMP1 and AMP2 can be adjusted (or converted) so that the first and second output buffers AMP1 and AMP2 have the same offset direction.

In this regard, referring to FIG. 10, for example, for the first channel CH(1) with the opposite offset directions in the same chopping state, when the first output buffer AMP1(1) is in the + and −chopping states, the second output buffer AMP2(1)) can be adjusted (or changed) to the − and +chopping states conversely to the first output buffer AMP1 (1), so that the second output buffer AMP2(1) can be driven by setting it in the chopping state opposite to that of the first output buffer AMP1(1) for each frame FR. Accordingly, the output voltages of the first and second output buffers AMP1 (1) and AMP2(1) of the first channel CH(1) are offset in the same direction for each frame FR, and the output voltage deviation between the first and second output buffers AMP1 (1) and AMP2(1) can be significantly reduced from 10 mV to 0 mV.

Similarly, for the second channel CH(2) with the opposite offset directions in the same chopping state, when the first output buffer AMP1(2) is in the + and −chopping states, the second output buffer AMP2(2) can be adjusted to the − and +chopping states conversely to the first output buffer AMP1 (2), so that the second output buffer AMP2(2) can be driven by setting it in the chopping state opposite to that of the first output buffer AMP1(2) for each frame FR. Accordingly, the output voltages of the first and second output buffers AMP1 (2) and AMP2(2) of the second channel CH(2) are offset in the same direction for each frame FR, and the output voltage deviation between the first and second output buffers AMP1 (2) and AMP2(2) can be significantly reduced from 18 mV to 2 mV.

In addition, for the fourth channel CH(4) with the opposite offset directions in the same chopping state, when the first output buffer AMP1(4) is in the + and −chopping states, the second output buffer AMP2(4) can be adjusted to the − and +chopping states conversely to the first output buffer AMP1(4), so that the second output buffer AMP2(4) can be driven by setting it to the chopping state opposite to that of the first output buffer AMP1(4) for each frame FR. Accordingly, the output voltages of the first and second output buffers AMP1(4) and AMP2(4) of the fourth channel CH(4) are offset in the same direction for each frame FR, and the output voltage deviation between the first and second output buffers AMP1(4) and AMP2(4) can be significantly reduced from 25 mV to 5 mV.

Meanwhile, for the third channel CH(3) with the same offset directions in the same chopping state, the first and second output buffers AMP1(3) and AMP2(3) have the same offset direction for each frame FR, thus the output voltage deviation is low, so that the chopping state of the first and second output buffers AMP1(3) and AMP2(3) is not adjusted. As another example, the chopping order of the first and second output buffers AMP1(3) and AMP2(3) can be changed together, and in this case, the first output buffer AMP1(3) can be changed from chopping alternation of +,− to chopping alternation of −,+, and in the same manner, the second output buffer AMP2(3) can be changed from chopping alternation of +,− to chopping alternation of −,+.

As above, for the channel CH at which the offset directions of the first and second output buffers AMP1 and AMP2 are opposite, the chopping state of the second output buffer AMP2 can be adjusted so that it has the same offset direction as the first output buffer AMP1 in the same frame FR. As another example, the chopping state of the first output buffer AMP1 can be adjusted. In other words, based on one of the first and second output buffers AMP1 and AMP2, the chopping state of the other of the first and second output buffers AMP1 and AMP2 can be adjusted.

Accordingly, the offset directions of the first and second output buffers AMP1 and AMP2 of the channel CH can be changed to be the same, so that the output voltage deviation between the first and second output buffers AMP1 and AMP2 can be significantly reduced.

As such, by adjusting the offset directions of the first and second output buffers AMP1 and AMP2 of the channel CH to be the same, the overcurrent due to the output voltage deviation between the first and second output buffers AMP1 and AMP2 can be reduced or prevented.

Therefore, power consumption can be reduced, enabling low-power operation, and damage to the driving circuit of the data drive portion 220 due to the overcurrent can be prevented.

Hereinafter, a process for adjusting the output voltage offset directions of the first and second output buffers AMP1 and AMP2 of the channel CH to be the same is described in more detail with further reference to FIG. 11.

Figure 11:
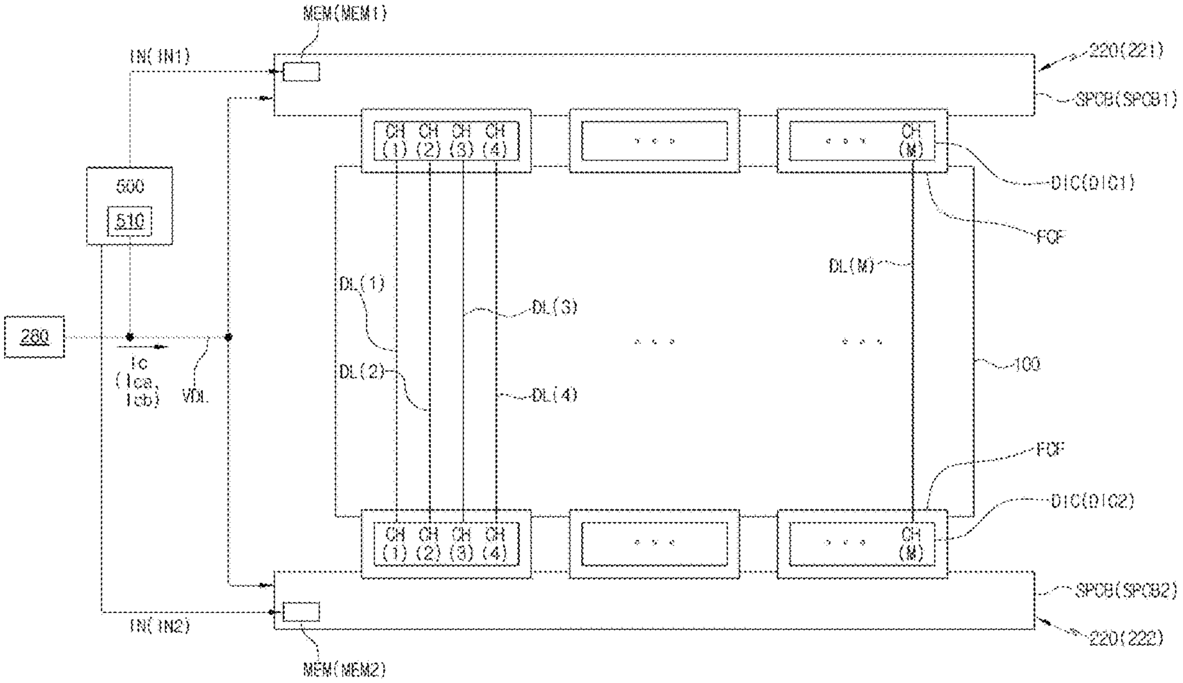
FIG. 11 is a view schematically illustrating an adjustment device used in a test process for inspecting and adjusting offset directions of first and second output buffers of a channel, a display panel, and a data driving portion according to an embodiment of the present disclosure.

FIG. 11 is a view schematically illustrating an adjustment device used in a test process for inspecting and adjusting offset directions of first and second output buffers of a channel, a display panel, and a data driving portion according to an embodiment of the present disclosure.

Referring to FIG. 11, for example, the adjustment device 500 can be used in a test process for adjusting the offset direction of the first and second output buffers AMP1 and AMP2 before shipment of a display apparatus. In other words, in a broad sense, the adjustment device 500 can be used in a test process for generating a chopping driving information (or a chopping status information) IN which is an information for detecting and adjusting the offset direction, among the manufacturing processes of the display apparatus. The chopping driving information IN generated through the test process can be transmitted to, recorded, and stored in the memory MEM of the data driving portion 220.

The adjustment device 500 can include, for example, an ammeter 510 for measuring a current consumption Ic (or power consumption) of the data driving portion 220.

In this regard, the power supply portion 280 can provide a driving power for driving the first and second data driving portions 221 and 222 of the double bank structure through a power line VDL, and the first and second data driving portions 221 and 222 (or the first and second data ICs DIC1 and DIC2) can each output the data voltages Vdata from the plurality of channels CH, for example, M channels CH(1) to CH(M), and supply the data voltages Vdata to M data lines DL(1) to DL(M) of the display panel 100.

The current consumption Ic consumed when driving the first and second data driving portions 221 and 222 can be measured by the ammeter 510 of the adjustment device 500.

As such, through the current consumption Ic measured by the ammeter 510, it is possible to determine whether the output voltage offset direction is the same or opposite between the first and second output buffers AMP1 and AMP2 of the channel CH.

For example, the ammeter 510 can measure the current consumption (or first current consumption) Ica when the first and second output buffers AMP1 and AMP2 are in the same chopping state and the current consumption (or second current consumption) Ich when the first and second output buffers AMP1 and AMP2 are in the opposite chopping state, for each channel CH.

In this regard, for the first channel CH(1), the current consumption Ica can be measured when the first and second output buffers AMP1 and AMP2 are in the same chopping state, and the current consumption Ich can be measured when the first and second output buffers AMP1 and AMP2 are in the opposite chopping state. Here, in order to implement the opposite chopping state, a chopping alternation order of the first output buffer AMP1 can be maintained and a chopping alternation order of the second output buffer AMP2 can be changed, or a chopping alternation order of the second output buffer AMP2 can be maintained and a chopping alternation order of the first output buffer AMP1 can be changed.

In the same manner, for each of the second to M-th channels CH(2) to CH(M), the current consumption Ica can be measured when the first and second output buffers AMP1 and AMP2 are in the same chopping state, and the current consumption Ich can be measured when the first and second output buffers AMP1 and AMP2 are in the opposite chopping state.

Through this, the current consumption Ica when the first and second output buffers AMP1 and AMP2 are in the same chopping state and the current consumption Ich when the first and second output buffers AMP1 and AMP2 are in the opposite chopping state can be measured by channel CH through the ammeter 510.

The adjustment device 500 can compare the current consumption Ica when the first and second output buffers AMP1 and AMP2 are in the same chopping state and the current consumption Icb when the first and second output buffers AMP1 and AMP2 are in the opposite chopping state measured by channel CH through the ammeter 510.

As a result of the comparison, if the current consumption Ica when the first and second output buffers AMP1 and AMP2 are in the same chopping state is smaller than the current consumption Icb when the first and second output buffers AMP1 and AMP2 are in the opposite chopping state (i.e., Ica<Icb), this means that the output voltage deviation in the same chopping state is smaller. Therefore, in this case, it can be determined that in the same chopping state, the offset direction is the same between the first and second output buffers AMP1 and AMP2.

To the contrary, as a result of the comparison, if the current consumption Ica when the first and second output buffers AMP1 and AMP2 are in the same chopping state is larger than the current consumption Ich when the first and second output buffers AMP1 and AMP2 are in the opposite chopping state (i.e., Ica>Icb), this means that the output voltage deviation in the same chopping state is larger. Therefore, in this case, it can be determined that in the same chopping state, the offset direction is opposite between the first and second output buffers AMP1 and AMP2.

According to the comparison result, the chopping driving information IN can be generated to adjust the output voltage offset directions of the first and second output buffers AMP1 and AMP2 for each channel CH to be the same.

The chopping driving information IN can be an information that sets (or indicates) chopping state alternation orders (or chopping states by frame) of the first and second output buffers AMP1 and AMP2 for each channel CH. The chopping driving information IN can include, for example, a first chopping driving information IN1 indicating a chopping state alternation order of each channel CH of the first data driving portion 221, and a second chopping driving information IN2 indicating a chopping state alternation order of each channel CH of the second data driving portion 221.

The first chopping driving information IN1 can be transmitted to, recorded, and stored in the first memory MEM1 which is the memory MEM provided in the first data driving portion 221 (or the first source board SPCB1). The first chopping driving information IN1 stored in the first memory MEM1 can be loaded and used when the first data driving portion 221 is driven, and the chopping state of the first output buffer AMP1 for each channel CH can be alternated according to the chopping state set in the first chopping driving information IN1.

Likewise, the second chopping driving information IN2 can be transmitted to, recorded, and stored in, the second memory MEM2 which is the memory MEM provided in the second data driving portion 222 (or the second source board SPCB2). The second chopping driving information IN2 stored in the second memory MEM2 can be loaded and used when the second data driving portion 222 is driven, and the chopping state of the second output buffer AMP2 for each channel CH can be alternated according to the chopping state set in the second chopping driving information IN2.

Regarding the first and second chopping driving informations IN1 and IN2, referring to FIG. 10 together, for example, for the first channel CH(1), in the first chopping driving information IN1, the first output buffer AMP1(1) can be set (or adjusted) to have the + and − chopping states in odd and even frames FR, respectively. Further, in the second chopping driving information IN2, the second output buffer AMP2(1) can be set to have the − and + chopping states in the odd and even frames FR, respectively.

As such, through the first and second chopping driving informations IN1 and IN2, the chopping state of the output buffer AMP, for example, the second output buffer AMP2 (or the first output buffer AMP1), can be adjusted so that the output voltage offset directions of the first and second output buffers AMP1 and AMP2 are the same for each frame FR.

Accordingly, since the data voltage Vdata with the same offset direction can be output from first and second output buffers AMP1 and AMP2 for each channel CH, the deviation between the upper and lower output voltages of the channel CH can be reduced or eliminated.

Therefore, since the overcurrent due to the output voltage deviation between the upper and lower channels CH can be reduced or eliminated, power consumption can be reduced, enabling low-power driving, and damage to the driving circuit due to the overcurrent can be prevented.

As described above, in the embodiment of the present disclosure, when the upper and lower output buffers arranged by channel in the upper and lower data driving portions of the double bank structure are driven in the chopping mode, the chopping state of the output buffers can be adjusted so that the output voltages of the upper and lower output buffers for each channel have the offset in the same direction.

Accordingly, the upper and lower output buffers for each channel can output the data voltages in the same offset direction, so that the output voltage deviation between the upper and lower channels can be reduced or eliminated.

Therefore, since the overcurrent due to the output voltage deviation of the channel can be reduced or eliminated, power consumption can be reduced, enabling low-power driving, and damage to the driving circuit due to the overcurrent can be prevented.

It will be apparent to those skilled in the art that various modifications and variation can be made in the present disclosure without departing from the spirit or scope of the disclosure. Thus, it is intended that the present disclosure cover the modifications and variations of this disclosure and their equivalents.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display apparatus, comprising:

a display panel including a plurality of data lines and a plurality of pixels respectively connected to the plurality of data lines;

a first data driving portion including a plurality of channels respectively connected to first ends of the plurality of data lines and a plurality of first output buffers which are respectively arranged at the plurality of channels of the first data driving portion; and a second data driving portion including a plurality of channels respectively connected to second ends of the plurality of data lines and a plurality of second output buffers which are respectively arranged at the plurality of channels of the second data driving portion, wherein each of the first and second output buffers is alternately in a positive (+) chopping state or a negative (−) chopping state by frame, and wherein offset directions of output voltages of the first and second output buffers at the corresponding channels are a same in a same frame.

2. The display apparatus of claim 1, wherein the plurality of channels of the first and second data driving portions include a channel at which the first and second output buffers have a same chopping state in a same frame.

3. The display apparatus of claim 2, wherein at the channel at which the first and second output buffers have the same chopping state in the same frame, the first output buffer has a positive (+) offset in the negative (−) chopping state and has a negative (−) offset in the positive (+) chopping state, and the second output buffer has a positive (+) offset in the negative (−) chopping state and has a negative (−) offset in the positive (+) chopping state.

4. The display apparatus of claim 1, wherein the plurality of channels of the first and second data driving portions include a channel at which the first and second output buffers have opposite chopping states in the a frame.

5. The display apparatus of claim 4, wherein at the channel at which the first and second output buffers have the opposite chopping state in the same frame, the first output buffer has a positive (+) offset in the negative (−) chopping state and has a negative (−) offset in the positive (+) chopping state, and the second output buffer has a negative (−) offset in the negative (−) chopping state and has a positive (+) offset in the positive (+) chopping state.

6. The display apparatus of claim 1, wherein the positive (+) chopping state is a negative feedback state, and the negative (−) chopping state is a positive feedback state.

7. The display apparatus of claim 1, wherein each of the first and second output buffers has the offset direction of the output voltage in the positive (+) chopping state and the offset direction of the output voltage in the negative (−) chopping state which are opposite to each other.

8. The display apparatus of claim 1, wherein the first data driving portion includes a first memory storing a first chopping driving information in which the chopping state of the first output buffer by frame is set, and wherein the second data driving portion includes a second memory storing a second chopping driving information in which the chopping state of the second output buffer by frame is set.

9. The display apparatus of claim 1, wherein a current consumption when the offset directions of the output voltages of the first and second output buffers at the corresponding channel are same is smaller than a current consumption when the offset directions of the output voltages of the first and second output buffers at the corresponding channel are opposite.

10. The display apparatus of claim 1, wherein one of the plurality of pixels includes a light emitting diode.

11. A display apparatus, comprising:

a display panel including a plurality of data lines;

a first data driving portion including a plurality of first output buffers which are respectively connected to first ends of the plurality of data lines; and a second data driving portion including a plurality of second output buffers which are respectively connected to second ends of the plurality of data lines, wherein each of the first and second output buffers is alternately in a positive (+) chopping state or a negative (−) chopping state by frame, and wherein offset directions of data voltage outputs from a first output buffer and a second output buffer connected to a same data line are same.

12. The display apparatus of claim 11, wherein the first and second output buffers connected to one of the plurality of data lines have a same chopping state in a same frame.

13. The display apparatus of claim 12, wherein the first output buffer has a positive (+) offset in the negative (−) chopping state and has a negative (−) offset in the positive (+) chopping state, and the second output buffer has a positive (+) offset in the negative (−) chopping state and has a negative (−) offset in the positive (+) chopping state.

14. The display apparatus of claim 11, wherein the first and second output buffers connected to one of the plurality of data lines have opposite chopping states in a same frame.

15. The display apparatus of claim 14, wherein the first output buffer has a positive (+) offset in the negative (−) chopping state and has a negative (−) offset in the positive (+) chopping state, and the second output buffer has a negative (−) offset in the negative (−) chopping state and has a positive (+) offset in the positive (+) chopping state.

16. The display apparatus of claim 11, wherein the positive (+) chopping state is a negative feedback state, and the negative (−) chopping state is a positive feedback state.

17. The display apparatus of claim 11, wherein each of the first and second output buffers has the offset direction of the data voltage in the positive (+) chopping state and the offset direction of the data voltage in the negative (−) chopping state which are opposite to each other.

18. The display apparatus of claim 11, wherein the first data driving portion includes a first memory storing a first chopping driving information in which the chopping state of the first output buffer by frame is set, and wherein the second data driving portion includes a second memory storing a second chopping driving information in which the chopping state of the second output buffer by frame is set.

19. The display apparatus of claim 11, wherein a current consumption when the offset directions of the data voltages of the first and second output buffers connected to a same data line are same is smaller than a current consumption when the offset directions of the data voltages of the first and second output buffers connected to the same data line are opposite.

20. The display apparatus of claim 11, wherein the display panel includes a pixel connected to the data line and including a light emitting diode.

* * * * *